United States Patent
Hofman et al.

(10) Patent No.: US 8,320,629 B2
(45) Date of Patent: Nov. 27, 2012

(54) MULTI-LEVEL NEURAL NETWORK BASED CHARACTERS IDENTIFICATION METHOD AND SYSTEM

(75) Inventors: Yoram Hofman, Kfar-Bialik (IL); Alexandra Margolin, Haifa (IL)

(73) Assignee: Hi-Tech Solutions Ltd., Migdal Haemek (IL)

( * ) Notice: Subject to any disclaimer, the term of this patent is extended or adjusted under 35 U.S.C. 154(b) by 1011 days.

(21) Appl. No.: 12/028,885

(22) Filed: Feb. 11, 2008

(65) Prior Publication Data

US 2008/0131001 A1    Jun. 5, 2008

Related U.S. Application Data

(63) Continuation of application No. 11/175,982, filed on Jul. 6, 2005, now abandoned.

(30) Foreign Application Priority Data

Jul. 6, 2004   (IL) .......................................... 162878

(51) Int. Cl.
*G06K 9/62* (2006.01)
(52) U.S. Cl. ......... 382/105; 382/187; 382/190; 382/292
(58) Field of Classification Search .................. 382/105
See application file for complete search history.

(56) References Cited

U.S. PATENT DOCUMENTS

| | | | | |
|---|---|---|---|---|
| 6,026,177 A * | 2/2000 | Mong et al. | ................ | 382/156 |
| 6,148,119 A * | 11/2000 | Takaoka | ........................ | 382/289 |
| 6,473,517 B1 * | 10/2002 | Tyan et al. | .................... | 382/105 |
| 2002/0126904 A1 * | 9/2002 | Kakutani et al. | ............. | 382/229 |
| 2006/0123051 A1 * | 6/2006 | Hofman et al. | ............. | 707/104.1 |

* cited by examiner

*Primary Examiner* — Brian P Werner
(74) *Attorney, Agent, or Firm* — Leason Ellis LLP; Ariel Reinitz

(57) ABSTRACT

A system and method, which enable precise and automatic identification of characters, perform and calibrate data verification to ensure data reliability. The system can process these identified characters, such as override adverse conditions, adjusting and correcting unclear characters and their images.

20 Claims, 34 Drawing Sheets

Original image 14 
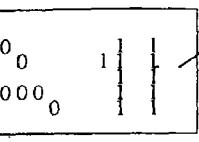 Blackboard 415
FIG. 6e          FIG. 6f
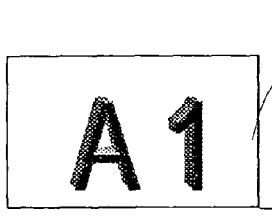 429
FIG. 6g
Horiz Gradient sum for each column 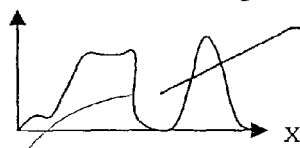 431 Possible space position
427   FIG. 6h
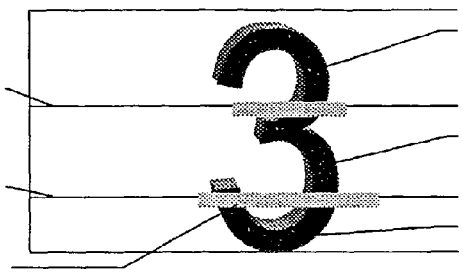
- 433 Upper part to be joined
- Upper beam 439
- 437 Symbol with small height
- Lower beam 441
- 435 Lower part to be joined
- White gap 443
FIG. 6i
447
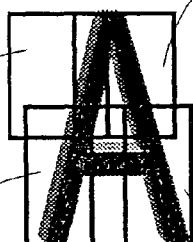 → 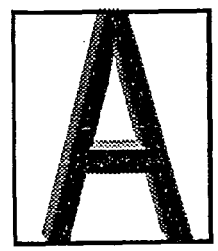
451
449
453   FIG. 6j        FIG. 6k

MULTI-LEVEL NEURAL NETWORK BASED CHARACTERS IDENTIFICATION METHOD AND SYSTEM

RELATED APPLICATIONS

This application is a continuation of U.S. patent application Ser. No. 11/175,982 filed Jul. 6, 2005 now abandoned, which claims priority to Israel Patent Application Number 162878 filed Jul. 6, 2004.

FIELD OF THE INVENTION

The present invention relates generally to a method and system for providing automatic characters recognition. More specifically, the present invention relates to a multi-level neural network based characters identification method and system.

BACKGROUND OF THE INVENTION

Systems based on character recognition are widely used in both home and office functions. For example scanners, which reads printed text and translates the image being scanned to a form of data, the computer is able to process (such as ASCII code, for example). Character recognition systems include an optical camera for photographing images, and sophisticated software for analyzing images. The arising need for identifying and analyzing text, characters or other signifying marks on a variety of products, vehicles and aircrafts led to the character recognition system expansion and the system being put to use in different areas of interest.

An operative system at the entrance to harbors and shipping docks, for example, requires means for identifying and monitoring trucks and container movement and placement, and automatic supply of information on any vehicle entering the area. In order for such a surveillance system to be effective, it is necessary for the system to be able to recognize and process a variety of identifying marks, such as license numbers, serial numbers and various insignia.

There are growing numbers of operational ports across the world, and an increasing rate of vehicle movement through them. This factor, hand in hand with the increasing need for reinforced security precautions, clearly calls for a sophisticated character recognition system. The need for such a system that will provide information based on observations from different angles, factoring in various interfering factors such as weather conditions, lighting etc. is undeniable.

Several algorithm based systems for identifying marks or characters have been presented to date. For example a system detailed in U.S. Pat. No. 6,026,177 titled "method for identifying a sequence of alphanumeric characters". The patent describes a set of algorithms that can be used to extract a text of numbers and characters from a digital image. It focuses on two practical applications: vision based vehicle license plate recognition (LPR) and container code recognition (CCR). The patent discloses the uses of standard image processing methods e.g. filtering, binarization, in addition to standard programming techniques such as level classification.

The main drawback of this method, and several others in the field, which limits application considerably, relates to the limited number of identifying marks recognized and processed by the method. Additionally, none of the systems in use today include a method for verification and control of the information retrieved to assess whether the identification is indeed accurate. This lack of inspection and verification greatly question the credibility of these inadequate systems.

Additionally, these systems in use today all perform the identification, adjustment, improvement and deciphering stages equally and continuously on one picture in its entirety. The process is expensive and time consuming and does not always result in a successful and reliable identification. Another major drawback when considering these systems is the need for a strong computer to run the identification programs. This is largely due to the complex algorithm employed, which is based on complicated functions and variables, which take long to run even on the strongest of computing systems. For example, some of these programs use floating points instead of integers, or rely on "heavy" algorithms, which take longer to process and compute. Thus, there is a demonstrated need for an optical character recognition method, which will enable quick and simultaneous identification of as many details as possible.

Furthermore, there is a need for a multi-functional universal system that will provide character identification in a wide variety of fields with the same success.

Additionally, the system must be able to perform self-testing and data verification to ensure reliable and repeatable data.

Furthermore, there is a need for a system that is able to standardize and adjust levels in order to decipher a faulty image received as a result of bad visibility or severe weather conditions.

The method must also be able to run on simple computing system, which does not require expensive and complicated hardware to run smoothly and without error.

It should be able to perform an exact and verified identification in a method, which is both fast and reliable.

The method should be able to answer individual needs and demands, and offers information that is both accurate and easily and cheaply accessible.

OBJECTS AND SUMMARY OF THE INVENTION

Therefore it is an object of the present invention to provide fast and reliable methods to enable reading and deciphering characters on site.

It is a further object of the present invention to provide methods that can override adverse conditions and be able to adjust and correct partially unclear images.

It is a further object of the present invention to provide methods that can perform and calibrate data verification to ensure data reliability.

It is yet a further object of the present invention to provide a multi-functional method, which can be used in any number of fields such as vehicle license plate recorders, inventory and storage management, aircraft traffic administration etc.

These objectives and others not mentioned hereinabove are accomplished by the method of the present invention in which initial images taken by a certain device, such as a device for recording license plates of passing cars, are sent to an identification program which operates the present identification method and deciphering units, which will eventually carry out the required identification process of the initial images received.

Identification process includes the following steps: The initial image is stored in a string type buffer on which the deciphering will be carried out. Apart from the buffer the program includes relevant files with information and param eters pertaining to identification process. Once the initial image has been stored and buffered the following occurs:
1. A matrix is constructed based on the initial image and several image options, according to the buffer information and the original file received.
2. Targeting areas in the initial image that have greater probability of containing relevant information i.e. the characters required for identification.
3. Selecting the target area out of the potential areas preselected before.
4. Adjustment and improvement of the selected area, which includes separating the characters from the surrounding layers and removing other unnecessary noise elements in the image, selected.
5. Separating the characters selected and examining each separately.
6. Identification and verification of each character utilizing various control and standards procedures.
7. Verifying the entire result within a pre-defined list of formats
8. The results are then transferred onto the application step.

The character identification method as described in the present invention combines several ways of identification creating a uniform method providing fast and accurate identification as well as relevant answers to several diverse problems in the identification process that has not been regarded or solved in any of the original methods it is based upon. Thus the uniform system created provides a fitting answer to the needs of today's security and identification systems which demands an operation system that is both fast and accurate. The identification system, despite its complexity and flexibility, is based on relatively simple functions and variables enabling the system to operate on ordinary, not overly complex, computing systems.

BRIEF DESCRIPTION OF THE DRAWINGS

The following detailed description of exemplary embodiments of the present invention can best be understood by reference to the accompanying drawing, in which.

DETAILED DESCRIPTION OF THE INVENTION

Figure 1A:
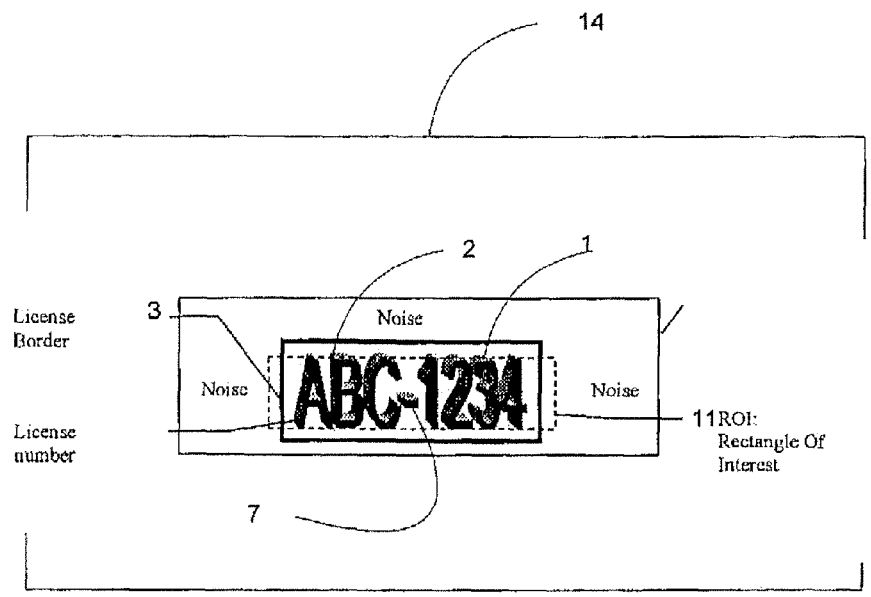
FIG. 1a illustrates an exemplary original image describing different terms in accordance with the present invention.
Figure 1B:
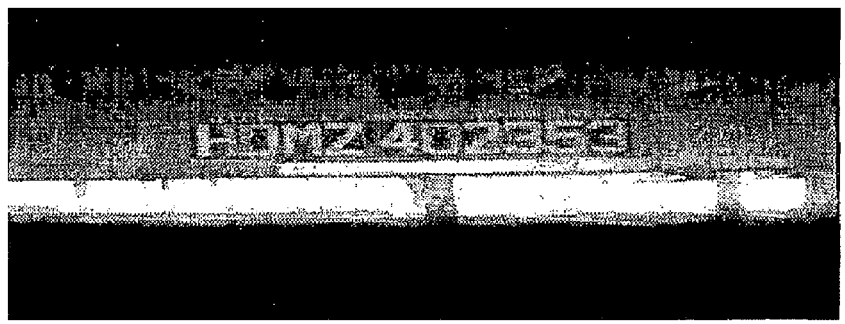
FIG. 1b show real image of a container chassis marking.

In the detailed description of exemplary embodiments which follows, the following terms should be generally be understood as specified in FIG. 1a unless otherwise specified:

Original image 14—the initial image captured and sent by recognition system to identification program. All identification steps and actions will be carried out on the initial image as will be shown later on. For example initial images of container code number pictured by container code recognition system. An example of real original image 14 of a container chassis is shown in FIG. 1b.

Candidate areas 3—areas, which possibly contain target area 1.

Characters 2—characters needed to be identified located in target area 1.

Data-Format 9 (not shown)—includes all data for initializing and processing original image.

ROI 11—Rectangle Of Interest, which contain characters only.

Target area 1—area that includes characters 2 needed to be identified.

SF 5 (Structure format) (not shown)—defines the number of characters in each segment.

There are two types of formats: a one-level format, and a two level format.

One-level format—for example, license number consists only one string.

Two-level format—license number consists of two strings, one above the other. Both Formats include one or more segments separated by anchors 7.

There are additional two kinds of SF 5—fixed format and a floating format:

Fixed format—includes a fixed number of characters 2 in each segment.

Floating format—includes a range of number of characters 2 in each segment.

Both, fixed and floating formats include anchors 7 that separate segments.

A format can specify connections between segment types, for example a format can specify that second segment is the same type as the first segment.

Anchor 7—define the segments of the recognized number.

There are several types of anchors 7:
  Space anchor
  Minus anchor (includes also dirty minus with some junk around the minus sign)
  Icon anchor 15

Segment—homogenous segment which might include only digits or only characters (the type of characters, i.e whether it contains all-digit or all-letter, is not defined in as long as only one kind is present).

Segment sometimes include a tail of characters 2 for which it can be specified whether it consists of digits or of characters. The tail of the segment can also have a homogenous type. It can also not be homogenous but have a tail which is homogenous and it will be defined as such.

An example of different segments is described in the table below:

| Segment Example | Explanation of segment type |
| --- | --- |
| (ABCD) | Homogenous segment without tail |
| (AB123, ABC123, A123) | Homogenous segment with homogenous tail |
| (A3CCH5) | Segment and tail not homogenous |

| Segment Example | Explanation of segment type |
| --- | --- |
| (A5B123, A5BC123, A5BCD123) | Not homogenous segment with homogenous tail |
| (AB2H3, ABC2H3, ABCD2H3) | Homogenous segment with non homogenous tail |

Status—for estimating the success of a match. specifies whether a given characters 2 was determined by the appropriate network as a letter or as a digit.

Figure 2:
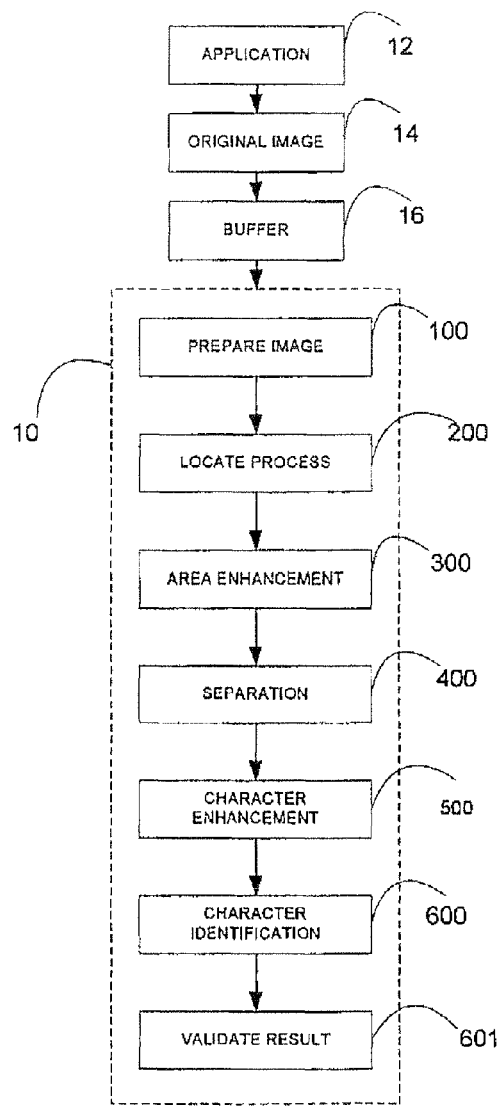
FIG. 2 is an overview flowchart describing Character Recognition Process in accordance with the present invention.

With reference to FIG. 2 an overview flowchart of Character Recognition Process (CRP) 10 is shown. Original image 14 supplied by application 12 (for example, a car plate recognition system) is inserted to buffer 16 and sent for CRP 10. CPR 10 begins as prepare-image function 100 is activated. Prepare image function 100 includes several functions, which are used during initial image preparation for further processing original image 14.

In the next step, locate process 200 is activated for finding candidate areas 3 in original image 14, that can possibly contain characters 2. Locate process 200 is based on the fact that there is high horizontal gradient in the area of the characters. High gradient is a result of the difference between pixels of characters, and pixels of the background of the characters. At the beginning of the locate process 200 only coarse locations in original image 14 are received. After a first selection, better and exact locations are selected in original image 14, and several candidates with higher probability of being target area 1 are perceived. Some candidates are disposed of by checking different parameters and features which enable concluding that there is no text in candidate area 3.

After several good candidate areas 3 with high probability of containing characters 1 are received an area enhancement process 300 is activated. During area enhancement process 300, candidate areas 3 are enhanced in order to separate characters 2, from the background of characters 2 as much as possible, while at the same time not harm the text or render it unusable. Enhancement process 300 includes junk removal, such as points, lines, etc. Enhancement process 300 is based on a high-pass filtering function which will be described later in more detail.

In the next step, Letter separation process 400 is activated for detecting characters found on candidate areas 3. The aim of the separation process 400 is to divide candidate area 3 into separate characters detecting the edges of each character, space between the characters, anchor 7 (e.g. minus sign) and junk.

Separation process 400 is performed for each candidate area 3 and for each format separately, and it is stopped when the separation process succeeds.

In the next step character enhancement process 500 is activated. Each character in a given candidate area is enhanced by activating stretching and high pass function on candidate area 3. In the next step, a letter identification process 600 is activated for identifying a single letter. In addition, letter identification process 600 helps fitting the current separation of characters to a specific format. CRP 10 ends as the characters are identified and acceptable result i.e. target area 1 is recorded.

Detailed descriptions of the process and function of SPR shown in FIG. 2 are illustrated in FIG. 3-9.

Figure 3:
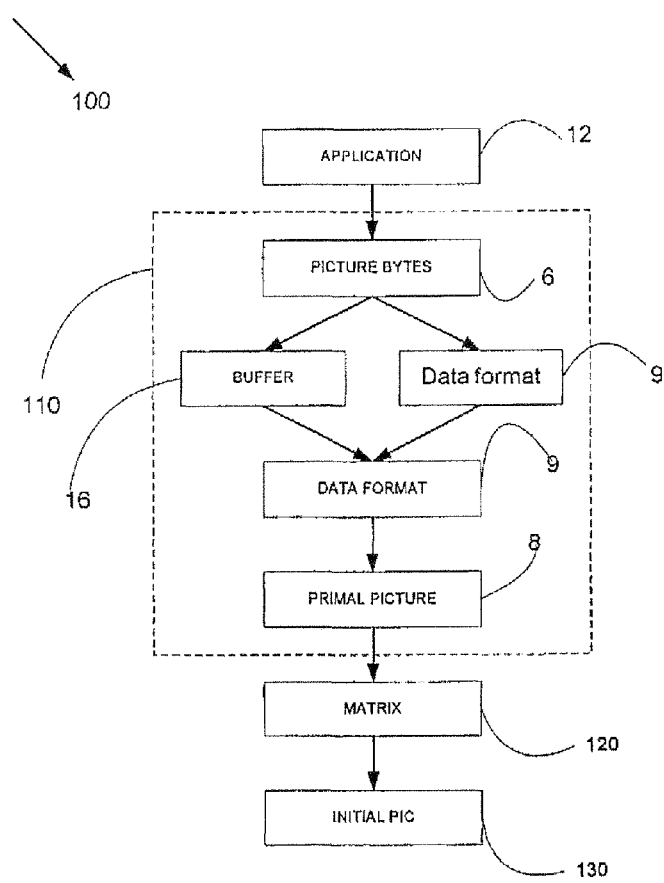
FIG. 3 illustrates a detail flowchart of prepare process.

FIG. 3 illustrates a detail flowchart of prepare process 100 of FIG. 2 for preparing original image 14 based on pictures bytes 6 supplied by application 12. Operation 110 performs insertion of picture bytes 6 supplied by application 12 to a buffer 16. Based on predefined data format 9 a primal picture 8 is initialized.

Preparing and initializing primal picture 8 includes building a two-dimension matrix 120 from one dimension buffer 16 based on data from Data-Format 9. Matrix 120 includes data concerning gradient and color of original image 14. Matrix 120 is used to speed up different calculations carried out during original image 14 processing.

Operation 130 performs initial picture transformations activated on matrix 120 according to predefined rules as specified in the following table (which defines if the image is frame (frame=1) or field (frame=0), and should the image be corrected for motion-related interlace effects (deinterlace=1)

| Data format 9 condition 1 | Data format 9 condition 2 | Action on initial picture |
| --- | --- | --- |
| Frame = 0 | None | create odd image lines using column interpolation |
| Frame = 1 | Deinterlace = 0 | Deliver the picture as is |
| Frame = 1 | Deinterlace = 1 | create odd image lines using column interpolation |

In addition to the actions activated during initial picture preparation 130 as described by the table, other pre-calculated array tables are used to perform histogram stretching on original image 14 for receiving a better image, thus enabling better results during SPR 10.

In order to increase the chances for a successful and precise identification, image sharpening and adjustment steps are required. In many cases the camera is partially blocked or obscured and in other cases the angle of the photograph is not ideal for identification. As a result the image are often partially unclear. The process of adjustment and correction filtering can help decipher these images.

Figure 4A:
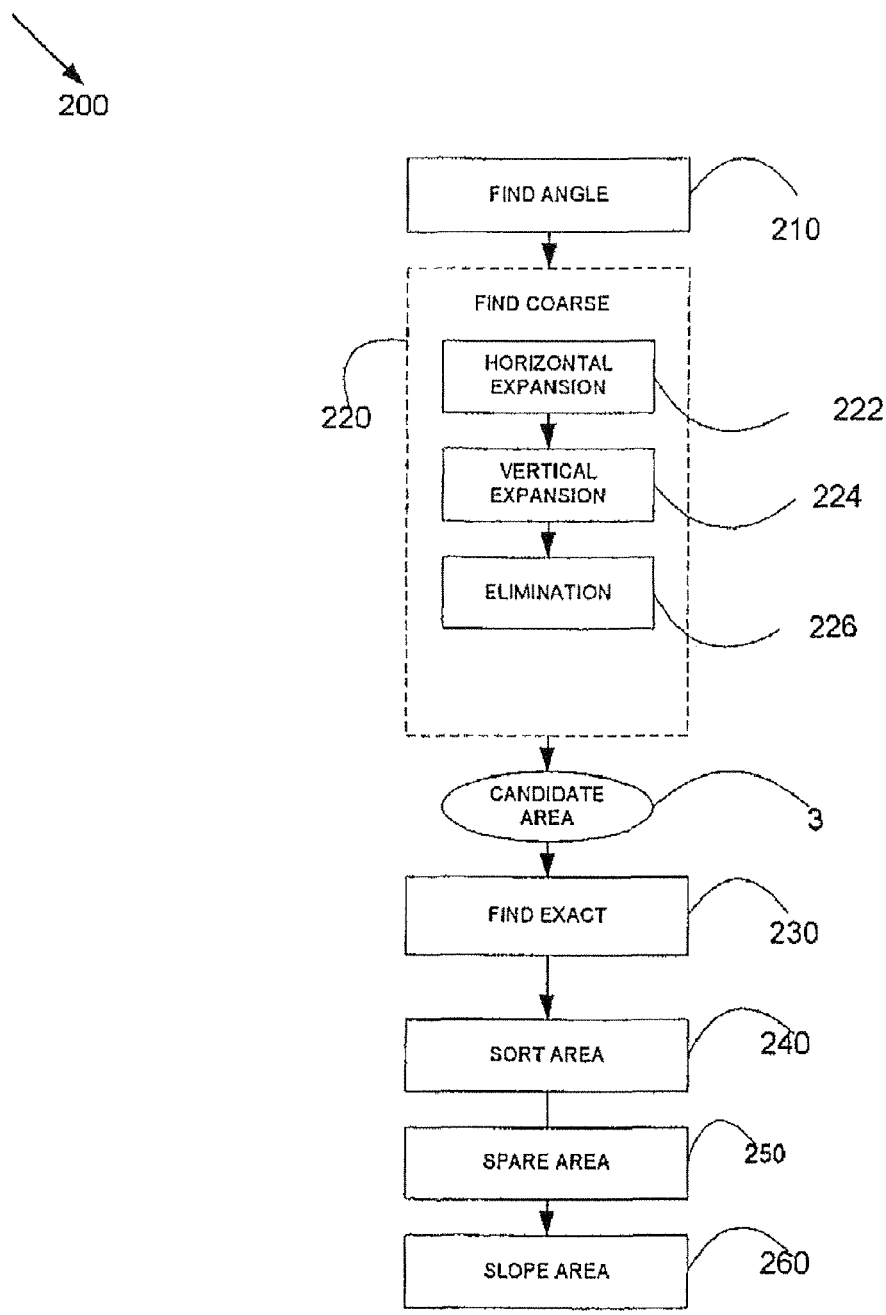
FIG. 4a illustrates a detail flowchart of locate process.

FIG. 4*a* illustrates a detail flowchart of locate process 200 of FIG. 2 for finding candidate areas 3 in original picture 14, which possibly contains characters 2. Find-angle function 210 is responsible for finding the angle by which original image 14 is possibly rotated and, applying a compensating rotation so that target image 1 characters will be positioned horizontally. The rotation angle is determined according to several parallel long straight lines that are found in original image 14. If parallel lines are not found on original image 14 a rotation process will not be activated.

Figure 4B:
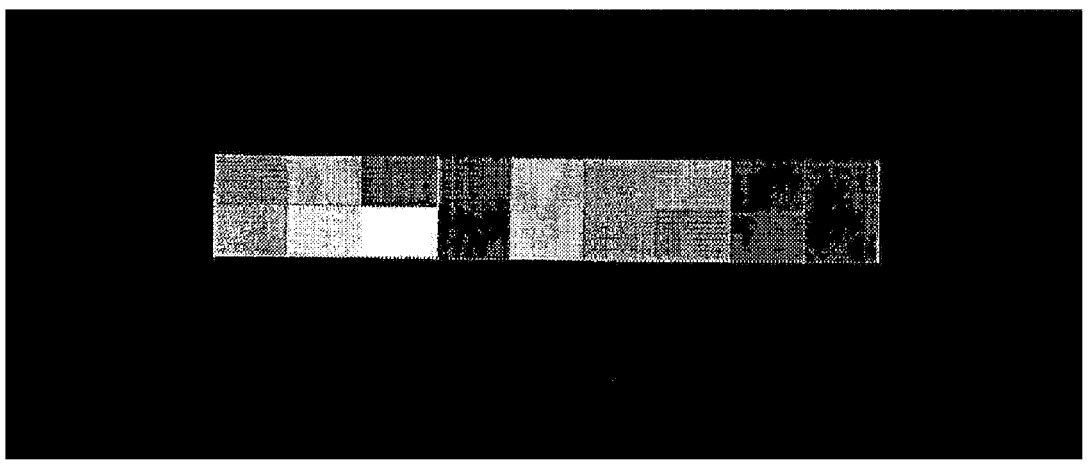
FIG. 4b show real original image bearing alphanumeric sequences.

The algorithm for finding parallel lines includes the above-mentioned steps:

1. Original image 14 is divided by a grid into rectangles 5 of a certain size, as shown in FIG. 4*b*.
2. For every non-edge point in each rectangle 5 a vertical gradient is calculated. Vertical gradient of rectangle 5 is defined as the sum of the vertical gradients of all rectangles' points.
   For example if A1, A2 and A3 are three grayscale levels in a column of a certain rectangle, then Vertical_Gradient(A2)=Abs(A3-A1). If Gradient value is less than 20 it is assumed to be zero to prevent noise.
3. Locate a set of rectangles 5 with vertical gradient above a certain threshold.
4. For each rectangle 5 from the here above mentioned set of rectangles—find two max-points on every rectangle side with maximal gradient. The slope of the rectangle is defined as the slope of the line passing through the two max-points. There are various validations to ensure that the rectangle's slope is within acceptable limits—the rectangle's slope is measured in degrees 15 and is currently in range [−45, +45].

5. In the next step original image 14 slopes is determined by combining several rectangles' slopes that were calculated in the previous steps. Every time a valid slope is found in some of the rectangles the valid slope is inserted to an array called 20 rollSlopes. For example, if A and B are the points on the sides of rectangle 5 with maximal vertical gradient value, than the slope is defined as (AC/AB), translated to degrees and rollSlopes[slope]+=AB. As mentioned, this step is preformed for every rectangle 5 original image 14 was divided by.

6. At the end of the find angle 210 process, the array rollslopes will contain a maximal value i.e. the longest line in the picture.

In the next step two searching functions are preformed:
1) coarse function 220, for searching coarse areas, which possibly contain characters 2.
2) Exact function 230 for searching exact area which include characters 2.

Coarse function 220 is executed firstly on rectangles 5 with maximum horizontal gradient and later the searching spreads horizontally and vertically as will be described below. Coarse searching process 220 continues on the next rectangle with maximum gradient. Coarse searching process 220 is repeated until a rectangle 5 with a gradient above a certain threshold cannon be found, or until fifteen area candidates 3 are found.

The coarse searching process 220 is described in more details in the following steps:
a) Horizontal expansion is performed using horizontal-search 10 function 222. Horizontal-search function 222 is executed on a given rectangle and expands to rectangles on the left and right, until the rectangles gradient drop below a certain threshold.
b) Following the horizontal and vertical expansion functions 222 and 224, a vertical elimination process 226 is activated. The purpose of elimination process 226 is to remove vertical lights from original image 14, such as vehicle headlights, etc. vertical lights usually appear in several rectangles with high horizontal gradients laying one upon another.
c) In the next step when the horizontal expansion is done a vertical expansion 224 is executed.

Exact-find function 230 receives candidate areas 3 from coarse function 220, and performs a refined search for locating more exact locations with a better potential to include target area 1. While coarse-search function 220 is based on the resolutions of rectangles, exact-find function 230 is based on the resolution of pixel lines and columns, thus enabling a fine-tuning of candidate areas 3.

Sort-areas function 240—sorts candidates areas 3 according to the width/height ratio. The closer this ratio is to the one defined in data format 9, the higher is the candidate rank. Thus, candidate areas 3 with the most perfect ratio from width to height are selected first.

Spare-areas function 250—removes several candidate areas 3. If there are several area candidates 3 which are based on the same grand-window, the candidate areas 3 removed are the ones with the width to height ratio most distant from the one defined in data format 9.

Figure 4C:
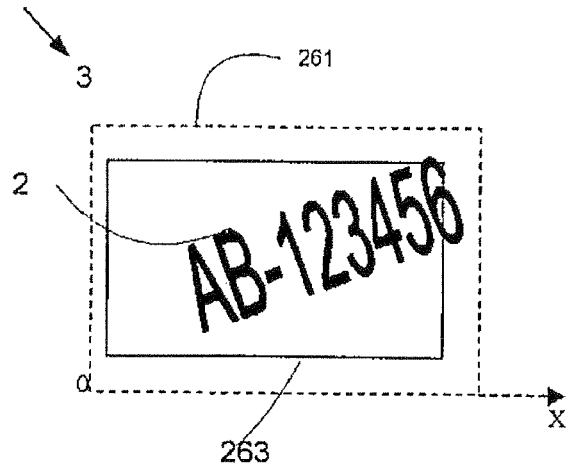
FIG. 4c illustrates locate character process.

Slope-area process 260—calculates the slope by which it is necessary to turn candidate area 3 so that the characters in it will be situated horizontally. Dotted area 261 as shown in FIG. 4*c* describes the broadened area around characters 2, enclosed within candidate area 3. Dotted area 261, and not lined area 263, is used to determine the slope. Dotted area 261 is chosen so that original candidate area 3 edges will be taken into account properly.

Figure 4D:
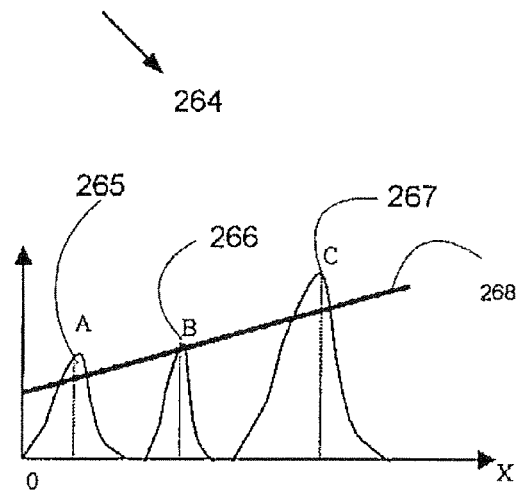
FIG. 4d shows peaks on a gradient graph.

Vertical gradient of dotted area 261 is calculated as shown in FIG. 4*d*. Peaks 265, 266, 267 on gradient graph 264 shown in FIG. 4*c* are marked. At this stage there is an attempt to find a straight line 268 that passes through marked points 265,266, 267 (approximation with minimal deviation). If deviation is too large, dotted area 261 in FIG. 4*c* is broadened even more, and slope-areas process 260 is repeated, using expanded area around candidate area slop.

At the end of locate process 200 several candidates area 3 with a maximal potential to include target image 1 are extracted.

Figure 5A:
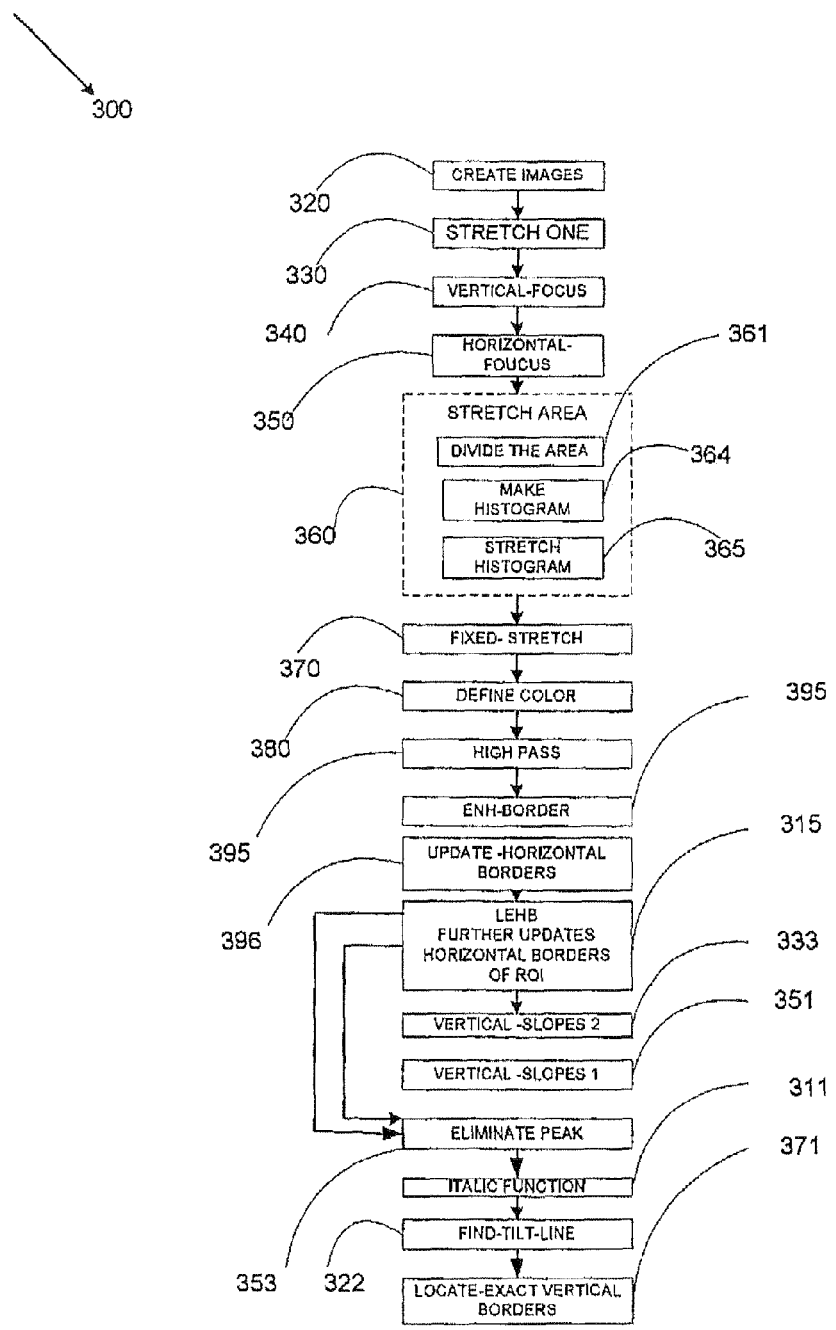
FIG. 5a illustrates a detail flowchart of area enhancement process.

FIG. 5*a* illustrates a detail flowchart of area enhancement process 300 of FIG. 2 for further enhancing the candidate areas 3 in original image 14, which possibly contain target area 1. Enhancement process 300 is activated in order to separate characters 2 from their background. During the enhancement process 300 it is important not to harm characters 2 in target area 1 and keep it clear of noise. The enhancement process 300 also includes junk removal, such us accident points, lines, etc.

Area enhancement process 300 includes the following functions: Create-Images function 320—prepares original image 3 structure (includes any picture sizes and bytes located in the memory) based on candidates area 3 found during location process 200. Create-Images function 320 allocates memory space for original image 3 and copies to these new locations data (of bytes and sizes), received by prepare image process 100.

Stretch one function 330—calculates max square ROI 11 of candidate area 3, which contain only characters and linearly stretches its histogram.

Figure 5B:
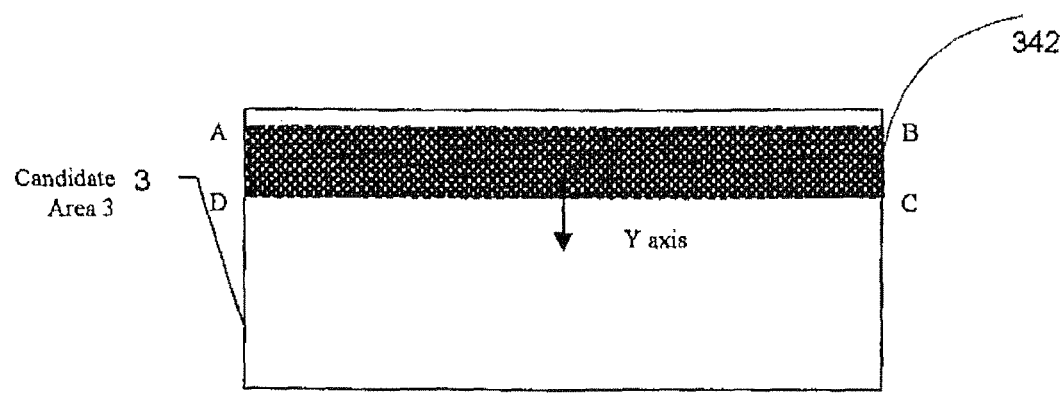
FIGS. 5(b)-(v) illustrates area enhancement process.
Figure 5C:
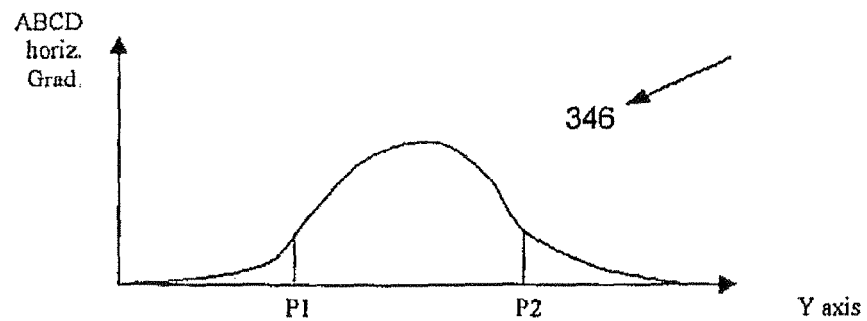

Vertical-focus function 340—estimates horizontal borders of ROI 11 by moving the upper ROI 11 border downwards and the lower border upwards. An example of how upper ROI border is detected is shown in FIG. 5*b*. Rectangle ABCD 342 is defined at the upper edge of candidate area 344. Rectangle ABCD 342 moves down, one horizontal line at a time. On each move, horizontal gradient of rectangle ABCD 342 is calculated (Horizontal gradient is defined as the sum of gradients of all rectangle's points). The results of the different rectangle gradient are described by graph 346, shown in FIG. 5*c*. Points P1 and P2, marked on graph 346, are defined as the place where the gradient drops below ⅓ of the candidate area 3 gradient. According to marked Points P1 and P2 the new ROI 11 borders are defined, and leaving noise that could be around characters 2 is left out.

Figure 5D:
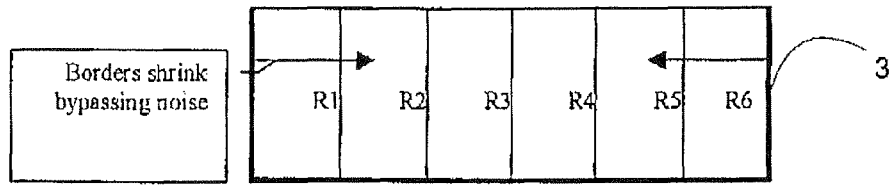
Figure 5E:
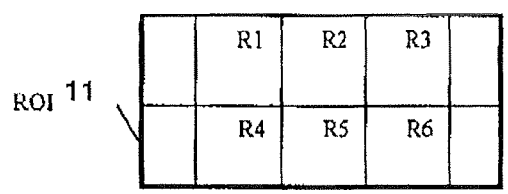

Horizontal-focus function 350—estimates ROI 11 so that they contain only characters 2. The separation between noise and characters 2, within the candidate area, is based on gradient calculation as will be further described. As shown in FIG. 5*d*, in the first step candidate area 3 is divided into similar rectangles R1-R6. In the next step Vertical Gradient is calculated for each rectangle Ri. The results of the different rectangle gradient (Ri) are described by graph 348 as shown in FIG. 5*e*.

At the end of horizontal-focus process 350, Rmax with maximal vertical gradient is defined as the rectangle which includes characters 2. As illustrated by graph 348, R3 with maximal gradient is rectangle which includes characters 2, while R1 and R6 include noise. The selection of Rmax is based on the assumption that the maximal vertical gradient will be in the area where the characters 2 are situated.

Although strong noise at the edges of the candidate area 3 will result in high gradient level in the appropriate rectangles, there will still be a significant difference between the gradient level on the rectangle with text and rectangles with noise. As seen in FIG. 5e the text is located in rectangles R2, R3, R4 and R5, while R1 and R6 contain noise.

Figure 5F:
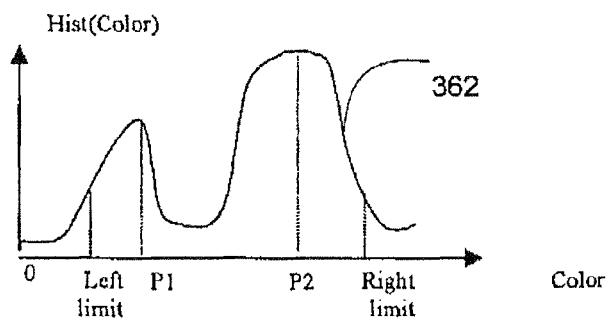

Stretch-area function 360—receives updated ROI 11, with borders close to characters 2 area, from vertical-focus 340. In step 361 ROI 11 area is divided into 4-8 rectangles as shown in FIG. 5e. In step 364, histogram 362 is calculated for each rectangle Ri as shown in FIG. 5f, and peaks P1 and P2 are calculated according to histogram 362. P1 corresponds to the text and P2 corresponds to background. The left limit of the histogram is defined on histogram 362 as the place left of P1 where histogram 362 value drops below ⅓ of Hist (P1). This point is marked as the Left limit. Similarly, Right limit is defined. By step 365 histogram stretching is performed linearly. As a result a new Left limit is mapped as point 0 (black grey level), and new Right limit is mapped as point 255 (white grey level). It should be noticed that if histogram stretching is activated separately in each rectangle the result will be contrast jumps between rectangles which would complicate the detection later. Therefore in order to avoid this problem, during the calculation of the histogram stretching, two consequent Left limits and two consequent Right limits are being taken into account, so that the contrast between the rectangles will be distributed evenly.

Figure 5G:
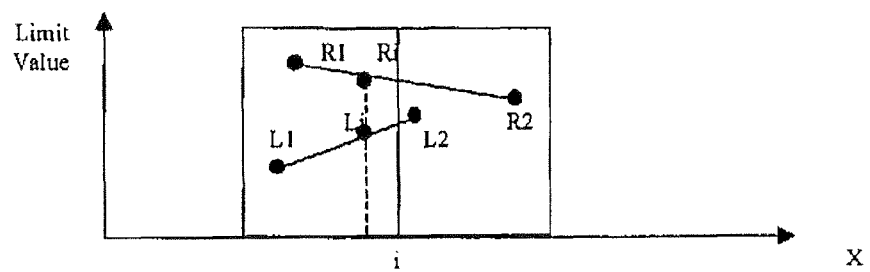
Figure 5H:
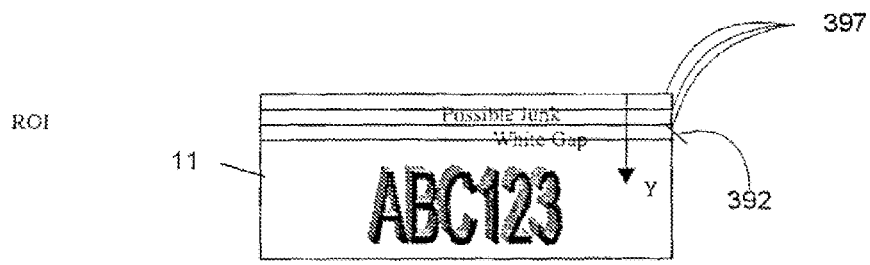
Figure 5I:
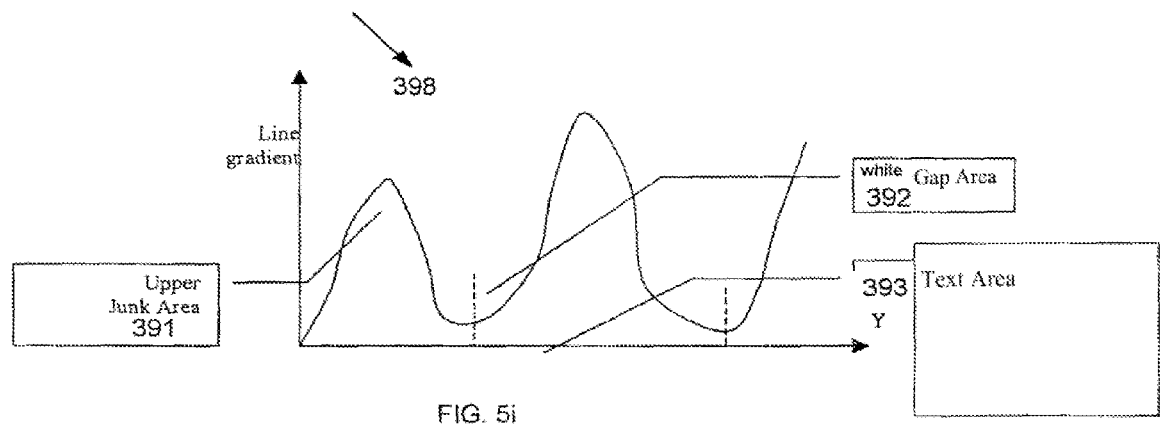

An example of how Left and Right limits are interpolated linearly between two consequent rectangles is shown in FIG. 5h.

According to the example L1 and R1 are Left and Right histogram limits belonging to left rectangle (as described in FIG. 5g). L2 and R2 are Left and Right histogram limits belonging to right rectangle.

The histogram stretching of Left and Right limits for points with coordinate X=i, will be Li and Ri accordingly.

The stretching is based on the fact that the closer the left limit the stronger influence it has on the stretching. This fact is also true for the right limit.

Fixed-stretch function 370—performs histogram stretching on the area outside ROI 11. Fixed-stretch function 370 uses the Left and Right limits of R1 and R3 accordingly (as seen in FIG. 5g) to perform the stretching of the ROI's 11 outside areas.

Define color function 380—defines the code color type of characters 2:

B—black characters on a white background or

W—white characters on a black background.

The expected window color type could be predefined in data format file 9. There are several expected code formats in single data format file 9 and therefore several types could be defined. It's also possible to define expected character 2 colors (BW) meaning that it's unknown what to expect—black of white characters.

High-pass function 390 applies high-pass filtering to original image as specified in the data format 9 file. High-pass filter cleans each candidate noise. The filter type is specified in data format file 9. It's possible to specify stronger or weaker filters in data format file 9, to accommodate to specifics camera conditions.

Picture table and filter table below, show an example of a high-pass 390 filtering process. According to filter table data, the new value of A5 in picture table will be defined as:

$$A5(new)=(-2)*(A4+A2+A6+A8)+9*A5$$

| Filter | | |
|---|---|---|
| | −2 | |
| −2 | 9 | −2 |
| | −2 | |

During area enhancement process 300 two kinds of filters are activated—regular filter, and gentle filter. The filter level is defined in data format file 9. Although both kinds of filters improve the sharpness of characters 2, the gentle filter has an advantage over the regular filter by preventing a strong wipe of the diagonal component of characters 2. It should be mentioned that High-pass function 395 sometimes succeeds in one format while failing in other formats. In addition, sometimes High-pass function 390 is activated more than once for each candidate area 3.

Enh-borders function 395—activates another fine-tune process on the borders ROI 11 located in candidate area 3. Another fine-tune process is necessary as ROI 11 borders can still contain some junk at the edges, due to rotations performed at previous stages, etc.

Update-horizontal-borders function 396—calculates the horizontal gradient of horizontal lines 397 at the upper edge of the ROI as shown in MG. 5i. The horizontal gradient is defined for each line as the sum of horizontal gradients of all points along the line.

Figure 5J:
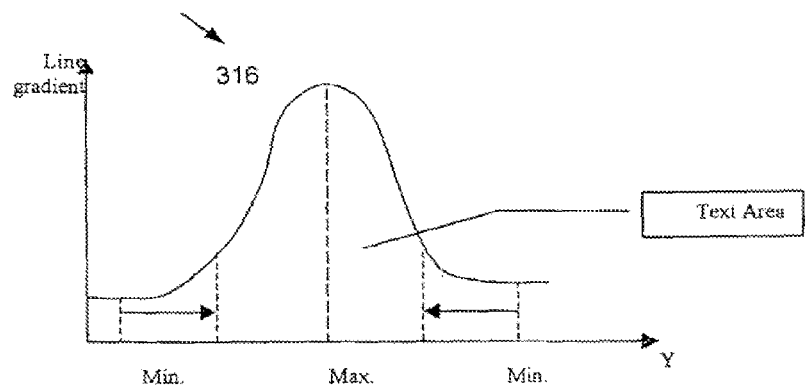

Histogram 398 presenting the different gradient of ROI 11 is shown in FIG. 5j. The fine tuning process is based on the assumption, that if there is junk 391 at the upper edge of ROI 11, and white gap 392 area between the junk and the text, there will be a gradient change between the lines. According to update-horizontal-borders function 396, instead of analyzing gradient of one line at a time a gradient, representing the sum of two consequent lines, is analyzed. When the calculated sum drops below a specific value defined in data format file 9 ("horizontal factor") background area is defined. In the next step borders of character are adjusted below the background area and above the text using eliminate-top-peaks and eliminate-bottom-peaks function.

There are situations when more than 2 minimums and maximums are found, as in graph 398 shown in FIG. 5j. In that case some of these extreme points are eliminated by find-correct-peaks function that is based on expected text dimensions specified in data format 9 file. The same process is performed to define the bottom horizontal border. As can be seen from the description above, the algorithm isn't perfect and it will eliminate only noise elements 15 separated from text by white gaps. Therefore additional adjustment is necessary as specified in the next function.

Figure 5K:

LEHB function 315 (Locate-exact-horizontal-borders)—updates the horizontal borders of ROI 11 by analyzing gradient map 398 shown in FIG. 5j. FIG. 5k describes histogram 316 of horizontal gradient map of the ROI 1120 received after removing the junk from ROI 11. Unfortunately, as a result of update border function 396, damage may be caused to the upper part of characters 2.

Two different algorithm are activated parallelly, one of the algorithm is based on gradient slope and the other algorithm is based on the character line.

Figure 5L:
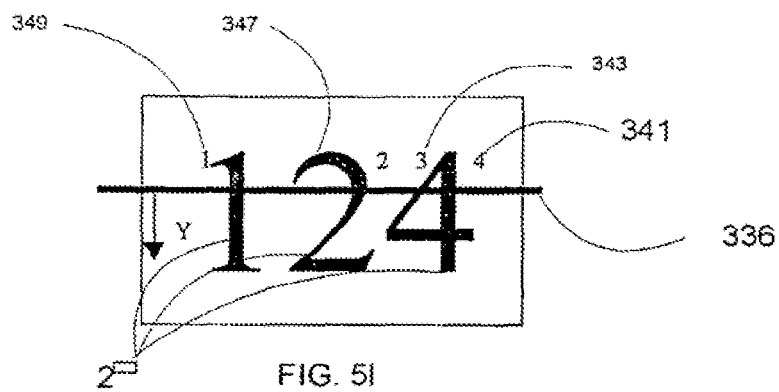

The second algorithm still needs to activate a function which will solve a problem which relates to numbers and digits like 5, 7, 9, F, T, E, P, Z, B, etc. These characters have low horizontal gradient at the upper part as shown in FIG. 5l. The area 318 marked by rectangle is almost fully black and there is almost no color change—as a result low horizontal gradient is received in this rectangle.

To solve this kind of problem VS2 function 333 (vertical-slope-2) is used. VS2 function 333 calculates the font line width. The calculated width is used later to adjust the border back if necessary. VS2 function 333—is called by LEHB function 315 and as mentioned, it calculates the average line width of the font. In addition it adjusts the horizontal borders so they begin at the place where they cross lines of characters 2. For every horizontal line, beginning from the top of ROI 11, the number of intersections of line 336 (shown in FIG. 5m) with characters 2 lines is calculated.

Figure 5M:
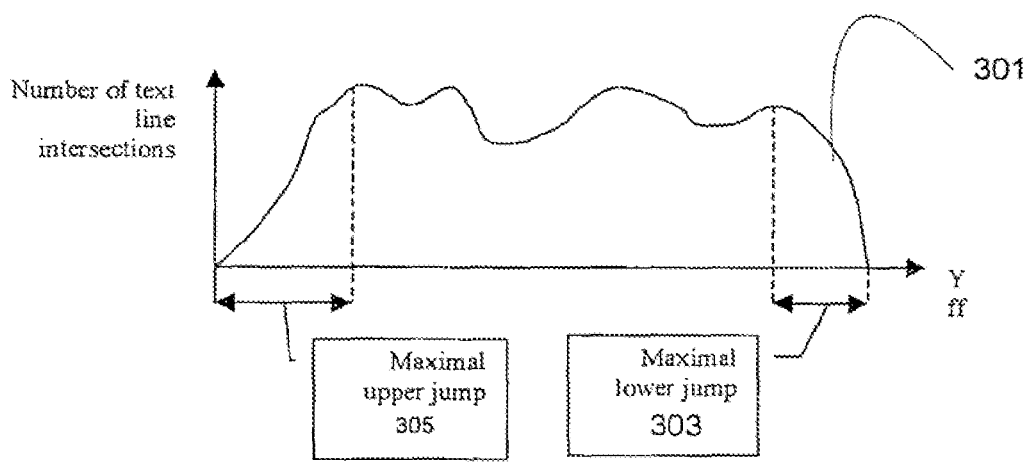

VS2 (vertical-slopes-2) function 333 calculates the number of intersections for each line. FIG. 5m illustrates the adjusting process activated by VS2 function 333. Line 336 crosses characters 2 lines in four places 341,343,347,349. VS2 function 333 builds graph 301 (shown in FIG. 5n) of number of line intersections as a function of coordinate Y (Y=intersecting horizontal line) as shown in FIG. 5K.

Figure 5N:
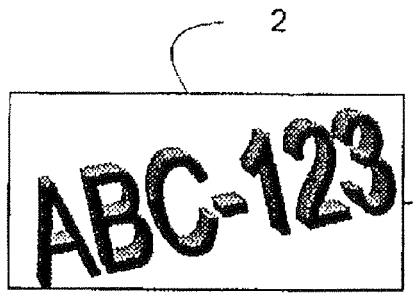

It's assumed that noise or white areas will have a low number of intersections given the probability that the number of black sequences with length within the range defined in data format 9 is low, in the noise and while areas. As line 336 starts to cross characters 2, the number of intersections rises significantly. This rise is assumed to be the approximate horizontal border of the text. As shown in FIG. 5n, maximal upper jump 305 and maximal lower jump 303 at the edges of graph 301 determine the approximate horizontal border of characters 2.

VS1 function 351 is called by LEHB function 315, and calculates for each horizontal line 336 the horizontal gradient divided by the color average in that line.

Eliminate-peak function 353—is called by LEHB function 315. Graph 301 received in VS1 function 351 may have more than 2 peaks. Some peaks are the result of noise on top of ROI 11. Eliminate-peak function 353 removes unwanted peaks by comparing the unwanted peaks to the average slope value in the middle of the area.

Figure 5O:
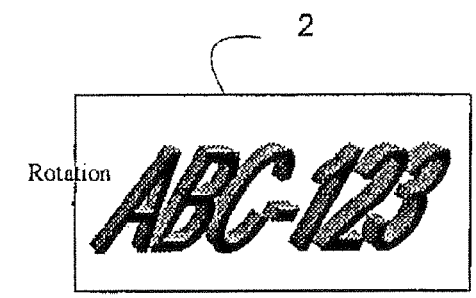
Figure 5P:
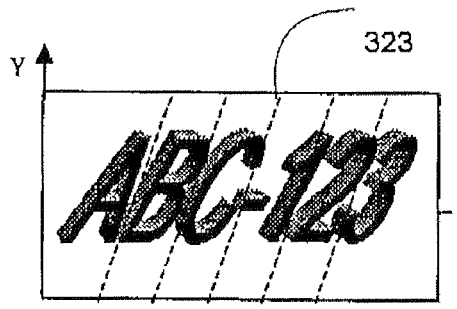

When original image 14 is rotated, so that it will be positioned horizontally, characters 2 in it are tilted a little and as a result they have an italic shape (an example of characters 2 before rotation is shown in FIG. 5o, while FIG. 5p illustrates tilted characters 2 after rotation). For deleting the italic effect, tilt function 311 is activated.

Figure 5Q:
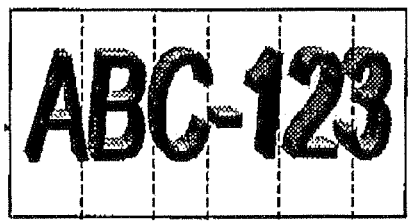
Figure 5R:
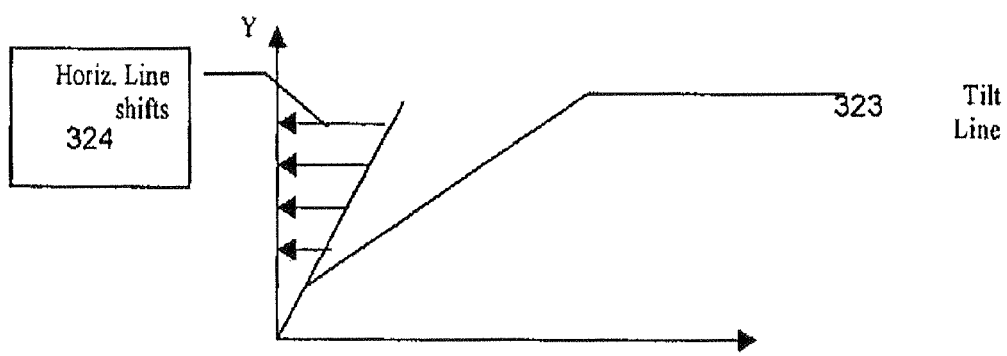
Figure 5S:
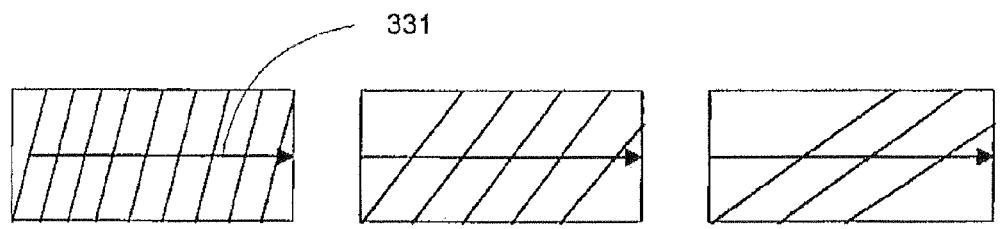

In the first step, tilt function 311 calls find-tilt-line function 322 for determining the tilt value of characters 2. In the next step tilt function 311 applies a line shifting technique for restoring the original tilt of characters 2. FIG. 5s shows characters 2 after shifting technique was operated on characters 2 in FIG. 5r. Dashed lines 323 on FIG. 5q represent the tilt of characters 2 found by find-tilt-line function 322. During italic process 371, each horizontal line 324 is shifted as shown in FIG. 5s.

Figure 5T:
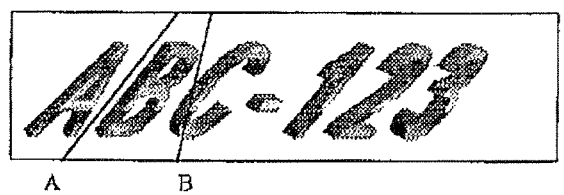
Figure 5U:
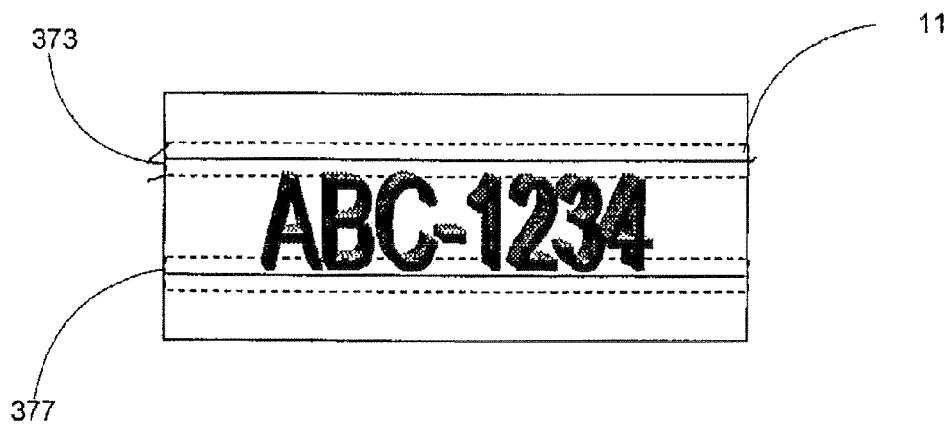
Figure 5V:
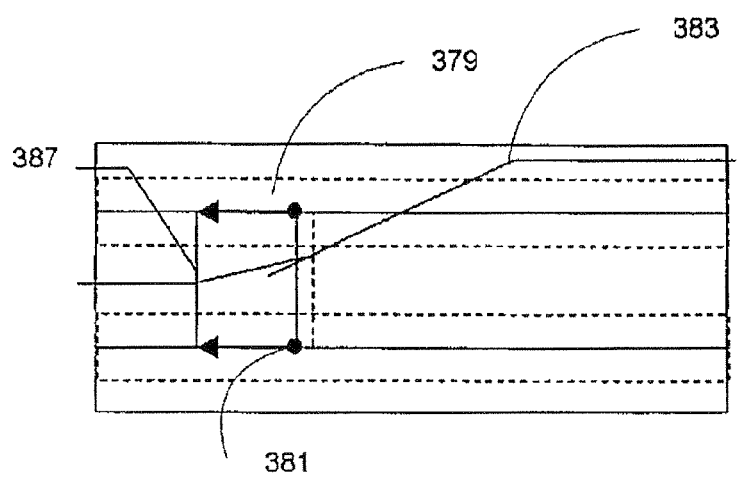

Find-tilt-line function 322—performs lookup on tilt lines 323 shown in FIG. 5q. The function examines several candidates for tilt lines 323 as shown in FIG. 5t. For each candidate tilt 323, expected tilt line is moved in the direction of arrow 331 and the number of white pixels is calculated for tilt line after each movement. A correct tilt candidate is found, when it fits exactly between characters 2, and when the number of white points on the line is high, as illustrated in FIG. 5vu. As can be seen in FIG. 5u line A is the correct tilt because there aren't any intersections between line A and characters A and B (and therefore a great number of white points are perceived). As shown in FIG. 5u line B crosses letter C, and no matter where line B will be placed horizontally, line B will cross a letter or a number. Therefore tilt A will be chosen.

After tilt process 311 is performed successfully there is a need to refine the vertical borders by activating LEVB (locate-exact-vertical-borders) function 371. Refining vertical borders couldn't have been done before since the text was tilted creating edge cases at the vertical borders of the characters 2.

LEVB function 371 for finding the left vertical border is activates as follows:
1) two narrow belts 373 and 377 are chosen near the horizontal borders as shown in FIG. 5v.
2) a search for 2 consequent black points 379, 381 on both horizontal borders is activated. The search begins at the middle of the upper and lower horizontal borders of ROI 11 and continues to the left simultaneously.
3) after points 379,381 are found there is a need to check whether points 379,381 are indeed the borders points of ROI 11. Thus, a calculation of the number of black pixels on each column on rectangle 383, placed on the left of the possible left border, is activated (as shown in FIG. 5w). Black pixels check continues until column 387 with 90% black pixels is found.
4) evaluation process is activated verifying that rectangle 383 between the borders found by the previous steps indeed include a character 2. If the rectangle has features of a character 2 (width to height ratio, percentage of black points and other features) then it is assumed that the column is part of a letter. Otherwise it is assumed that the left border was found and it is set at the column with 90% of black pixels.
5) continuing the search from the column with 90% black pixels.
6) right vertical border searching is activated similarly.

Figure 6A:
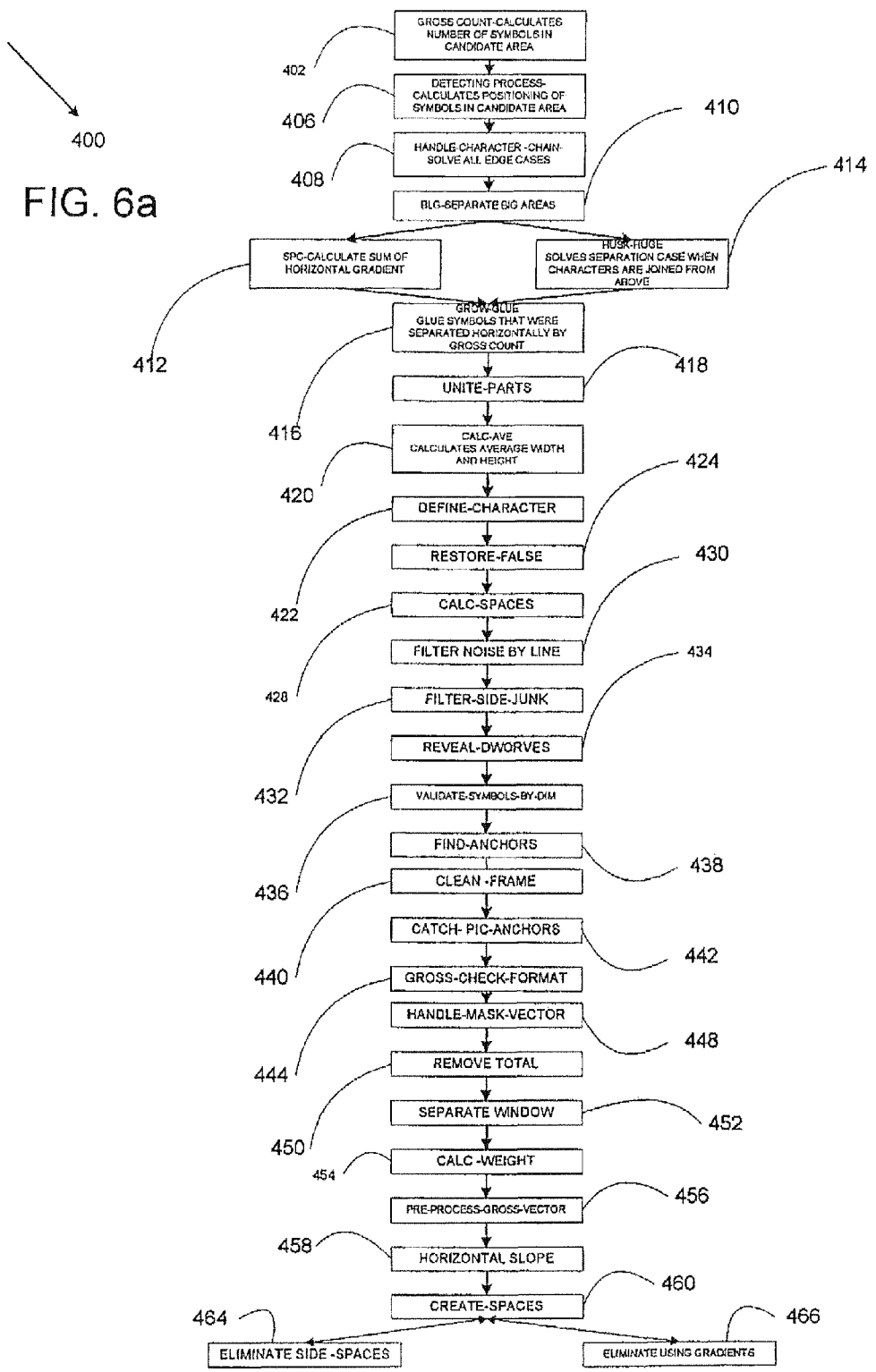
FIG. 6a illustrates a detail flowchart of letter separation process.

Referring now to FIG. 6a, describing a detailed flowchart of letter separation process 400. As shown in FIG. 2 character separation process 400 is activated after area enhancement process 300 is successfully executed Separation process function 400 receives an enhanced candidate area 3 and Structure Format (SF) 5, and performs separation process according to data format 9. The purpose of separation process 400 is to divide candidate area 3 into separate characters, detecting: borders (where a character begins and ends), space, anchor 7 (e.g. minus) and junk on each letter.

Separation process 400 includes the following functions: Grosscount function 402—calculates "roughly" the number of characters 2 in candidate area 3. The calculation is based on a specific SF 5. Thus, for different SF 5 different number of characters 2 may be received. In addition, Grosscount function 402 calculates gross-mask-vector 404, defined as exact borders of characters 2 (as will be explained below).

Detecting process 406—calculates roughly the positioning of characters 2 in candidate area 3, and sends data relating to the quality of the separation (ideal, well, bad or fail).

Figure 6B:
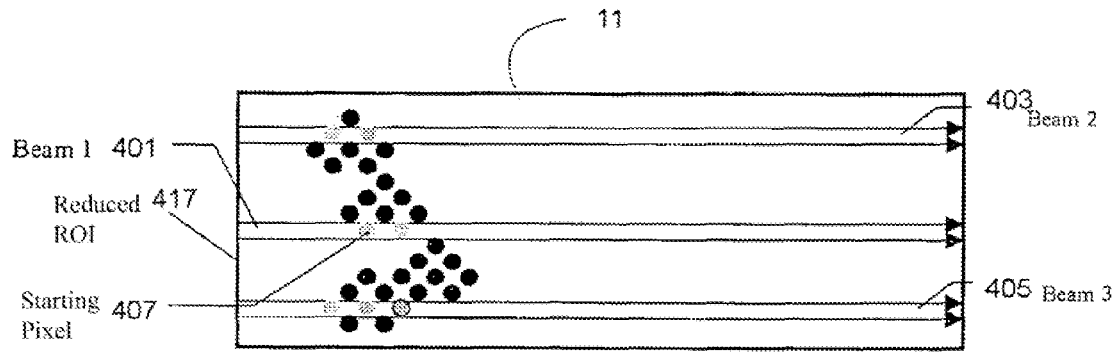
FIGS. 6(b)-(r) illustrates letter separation process.
Figure 6C:
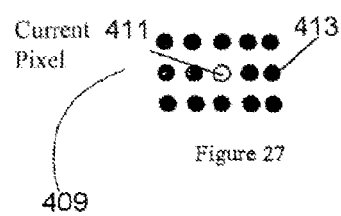

FIG. 6b shows produce-raw-characters function 406 being carried out on ROI 11. Three horizontal beams 401,403,405 are defined inside Reduced ROI 417. A search is operated starting from the left side of beam 401 until 2 consequent initial pixels 407 with gray level below a constant threshold are found. Afterwards, iterative BFS (Breadth First Search) for finding all black pixels connected to initial pixels 407 is performed. A search for the neighbors of pre-selected pixel is activated using matrix 409 shown in FIG. 6c. All black pixels shown in matrix 409 defined as neighbors if their grayscale level is below some constant threshold (i.e. they are black enough).

All fourteen neighbors 413 of current pixel 411 are appended to a special one-dimension array of pixels which will later be searched. For every next pixel visited from array new neighbors are found and appended to this array. Pixels are never appended to an array or visited twice to the array to avoid repetition. A special blackboard image 415 is allocated for the neighbors tracing as shown in FIG. 6f.

Figure 6D:
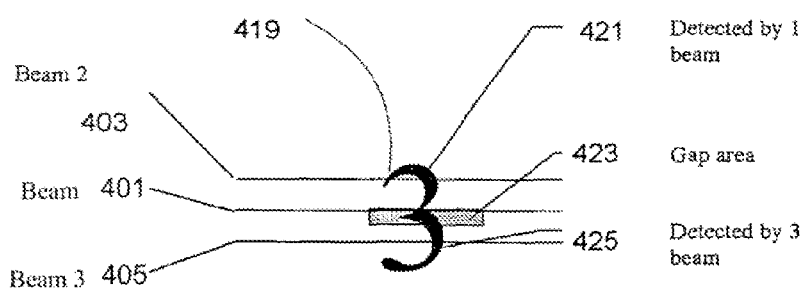

Detecting process 406 enables the detection and gathering of all connected areas where black pixels are located (further "pixel block") while unconnected junk is deleted and not connected to dark areas. However, central beam 401 sometimes fails to include and gather all characters 2 present, since there can be small horizontal gaps in the middle of a character as shown in FIG. 6d. In this case part of the character 2 will be detected by second 403 or third beam 405 as shown in FIG. 6d and the positioning process will be as follows:

1) Number 'three' 419 is divided into two separate parts. (Number 'three' will be later detected as a single character).
2) Detecting process 406 is activated by beam 401, 403 and 405 (part 421 is detected by beam 401, and 403 while part 425 is detected by beam 405).
3) When a pixel block is found starting from some initial pixel on a beam, it's inserted into blackboard 415.
4) Detecting process 406 advances along beam 401, 403 and 405 searching for additional initial pixels for building a pixel block around, and so on.

Blackboard 415 is shared by all three beams, so points detected as neighbors during a search by one beam won't be joined during the work of another beam, since they are noted as already visited pixels. Therefore, each beam can detect only pixel blocks that weren't detected by other beams. Each new pixel block is marked on blackboard 415 with a different index as shown in FIG. 6f.

Handle-characters function 408 is activated after rough characters 2 grosscount function 402 was performed. It is the objects of handle-characters function 408 to solve various edge cases that appeared during locate 200 and area enhancement 300 processes, and were not solved. The unsolved cases include the following problems:

Some characters 2 can be split during the previous steps as described in FIG. 6d.
Borders of ROI 11 may be accidentally identified as a character 2.
'Minus' (–) sign which separates digits on license plate may be accidentally identified as a character 2.
character 2 may touch the border and as a result they won't be separated.
Two characters 2 may stick together.
Noise (especially at the vertical edges) can be assumed to be characters 2.

Handle-characters function 408 solves all the above mentioned problems by performing different evaluations on separation results received by detecting function 406.

BLG (break-large-glued-groups) function 410 separates big areas that seem to be larger than a single character 2 as was defined in data format 9. The function depends on the assumed character width which is unknown. Therefore there are two calls—one with maximal character width received from data format 9 and other call is done after average character 2 width was calculated based, on first separation results. Two split attempts are performed at each call: SPC (split conglomerate characters) 412 and husk-huge 414.

SPC function 412 performs a split process based on horizontal 5 gradient graph 427 as shown in FIG. 6h.

The sum of horizontal gradients of all pixels in each column in picture 429 shown in FIG. 6g is calculated. As shown by graph 427 in FIG. 6h, calculated sum will be minimal where the spaces are possibly situated. The minimal areas 431 found in graph 427 help determine where spaces are located.

Husk-huge function 414—solves separation case i.e. when characters 2 are attached to one another, from above or from below, by a horizontal line.

Grow-glue function 416—sticks characters 2 that were separated horizontally by grosscount function 402. Grow-glue function 416 analyzes characters 2 with height of somewhat less than a normal height (this does not apply to the minus symbols) and vertically adds to characters 2 the parts that were separated from them. The adding process is activated in a similar way to detecting process 406 (shown in FIG. 6d). The difference between the two functions is that detecting process 406 performs only two beams, which move on the horizontal edges of characters 2 with small height, trying to find more distant neighbors.

As shown in FIG. 6i Upper and lower parts 433, 435 of number three 445 are attached to number three 445 because they are placed close enough to the central part of number three 445. The attachment process is done using recursive BFS.

Unite-parts function 418—attaches characters 2 that overlay each other by more than 5 pixels.

FIG. 6j shows an example of characters 2 with four overlaid areas 447, 449, 451 and 453. FIG. 6k shows characters 2 after the four overlaid areas were attached together.

Calc-ave function 420—calculates the average width and height of character 2. If there is a too big difference between character dimensions, the function finds a new set of characters 2 with similar dimensions and bases the calculations on the new characters.

Define-characters function 422—rechecks each character 2 dimensions in comparison with already calculated average width and height of the characters 2. Characters 2 with unreasonable dimensions are invalidated.

In some cases characters, invalidated by the previous function, can actually be valid ones. Restore-false function 424 searches for invalid characters 2 and check if they overlay horizontally some other good characters 2 (by 5 points or more). In case characters 2 dimensions are reasonable, the function restores them. After the restoration define-characters 422 is called again to recheck the rehabilitated characters 2.

Calc-spaces function 428—analyzes all the spaces between characters and calculates the average space width. Average space width is used later by filter-side-junk function 432.

Some valid characters 2 might be actually noise. Filter-noise-by-line-width function 430 identifies this kind of characters 2, by investigating whether font lines are present in the characters 2 as illustrated in FIG. 6L.

Figure 6L:
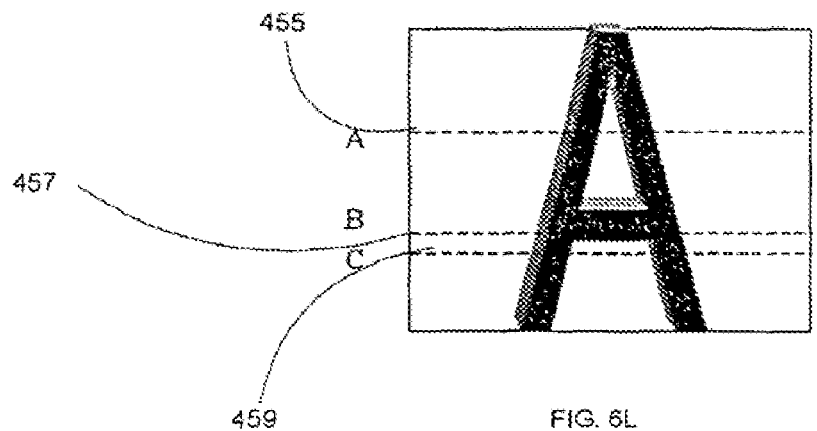

As shown in FIG. 6L, characters 2 area is separated into horizontal lines 455, 457 and 459 with width of one pixel. The function counts for each line the number of intersections with letter font line. The intersection evaluation is based on minimal and maximal line width defined in data format 9. For example, lines 455 and 459 intersects font line of the letter 'A' twice, while line 457 won't contain intersects since it intersects with too large section of letter 'A' at once. This section is probably bigger than maximal font line width.

Total number of horizontal lines that intersect at least once with font line is calculated. If the total number is less than half of horizontal rows in characters 2, characters 2 is assumed to be junk and it is invalidated. It's important to notice, however, that noise in the form of vertical sticks, which can be just remainders of the plate border, won't be filtered by this function. This is where filter-side-junk 432 function is employed.

In the detailed description of exemplary embodiments, which follows, the following terms should generally be understood as specified herein below unless otherwise specified:

Weight—of square, the sum of all grayscale levels in the square that belong to a font.

Square weight—the total number of pixels in the square. If this ratio is above some threshold it can be concluded that the square contains side junk instead of a valid characters 2.

Characters density—the ratio of weight to square weight.

Some side junk still remains unfiltered by previous functions and requires additional filtering.

Figure 6M:
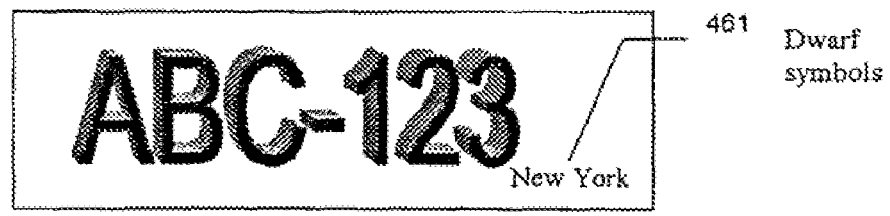
Figure 6N:

Filter-side-junk function 432—examines side characters and compares various deviations of characters 2 according to various average parameters of other characters lying close to side character. If some of the deviations are above predefined thresholds, the side characters are assumed to be junk. The average parameters on which deviations are calculated are:

Average height
Average width 20
Average center Y coordinate (vertical positioning of characters 2 is too high or too low)
Average density as defined above Small characters 461, as shown in FIG. 6*m*, may erroneously be regarded by the SPR 10 as valid characters 2. reveal-dwarves function 434 reveals small characters 461 by performing the steps below:

1) Separating each suspected character rectangle into a grid of small rectangles.
2) Calculating the sum of gray levels in every small rectangle.
3) Deviation of that value from the average one is calculated.
4) If the total deviation is above some threshold, ROI 11 is defined as ROI which includes small characters 461.

VCD (Validate-characters-dim) function 436 analyze different properties of unidentified characters 2, for example: their density (as was defined in previous function), and dimension. In addition VCD function 436 marks unidentified characters 2 as small, large or minus anchor 7 (by dimension), light or hard (by dimension and density). Characters 2 that look normal by size and density can be marked as normal by glue or normal by union. When all the characters 2 are successfully identified the function calculates the characters 2 max, min and average dimensions.

Find-anchors function 438—activates anchors 7 detection process. Anchors 7 are defined as separation characters 2 that divide ROI 11 into several parts. Examples of different anchors 7 are Minus sign 463 and space 465 as shown in FIG. 6*o*.

Figure 6O:
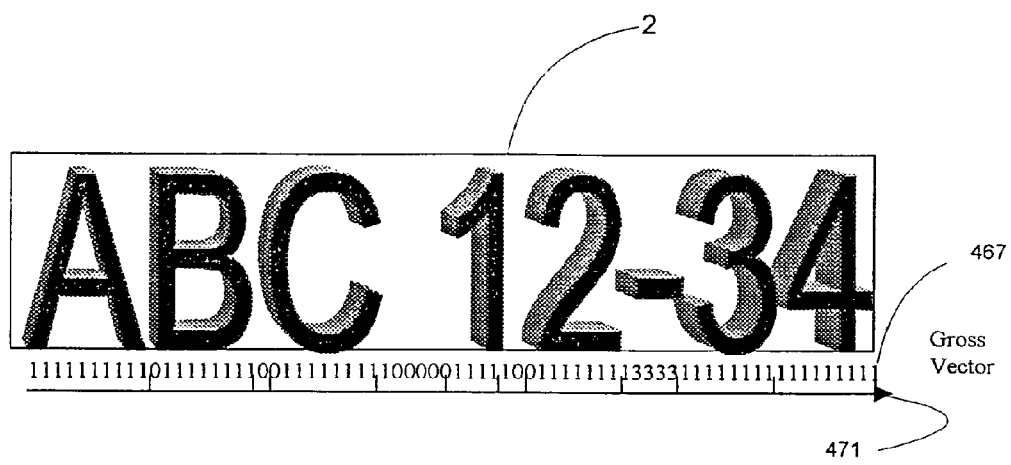

FIG. 6*o* describes three different segments:
1. A
2. BC
3. 123

There are several kinds of anchors 7 to be recognized:
Minus anchor 463
Space anchor 465
Unknown anchor 7
Junk mistaken for an anchor Anchors 7 detection process is performed based on characters 2 dimensions, average dimensions and predefined thresholds.

Clean-frame function 440—checks characters 2 proximity to ROI borders, and if characters 2 is thin enough. If the check succeeds, character 2 is marked as junk.

Some anchors 7, which are represented by a small icon rather than minus or space, are already defined by Data format 9. catch-picture-anchors 7 function 442 identifies such anchors 7 by analyzing the gray levels of characters 2 on the original image 14 (before enhancements) with those of the characters 2 neighbors. If the difference is above some threshold, it's assumed that the current character 2 is an icon anchor.

Gross-check-format function 444—checks whether the separation of characters 2 performed in the previous stages fits SF 5 defined in data format 9. The separation checking is activated by analyzing the number of anchors 7 and segments found during separation process 400. If the number of anchors 7 differ from the expected quantity, the function searches for 'weak' anchors' 7 (an anchor 7 with minimal width) and eliminate it if possible.

In addition gross-check-format function 444 unite segments 0-1 and 1-2 together so that the overall separation will fit SF 5. gross-check-format process is performed for cases where anchors 7 weren't detected correctly, and there are still extra anchors 7 in ROI 11.

Handle-mask-vector function 448— calculates gross mask vector 467 (shown in FIG. 6*o*)

Gross mask vector 467 activates a projection process on a string of characters 2 along axis X 471. There are five projection types:

| Projection type | Projection ID |
|---|---|
| PROJECTED_SPACE | 0 |
| PROJECTED_SYMB | 1 |
| PROJECTED_UNKNOWN | 2 |
| PROJECTED_MINUS | 3 |
| PROJECTED_JUNK | 4 |

An example of gross vector calculation for a regular string of characters is shown in FIG. 6*o*.

According to FIG. 6*o*, characters 2 area "ABC 1234" is marked with 1, space area is marked with 0 and "minus" (e.g. −) area is marked with 3, according to the above table.

In some cases characters 2 are connected to one another by horizontal bar at the top or at the bottom. The horizontal bar could be for example a remainder of a car plate border or some background noise. Such Horizontal bar connecting two characters 2 prevents separation from working properly and distorts gross vector 467.

Remove-total function 450—removes horizontal bar by updating ROI 11 borders so that they won't include horizontal bar.

The upper and lower bars are detected by analyzing the top and bottom lines of blackboard 415 received during gross-count process 402. Remove-total process is activated by calculating the number of black points at each line. If the calculation result is above some dynamic threshold it's assumed that an inappropriate bar was found.

In addition to edge horizontal lines with bars checking, remove-total function 450 checks horizontal lines neighbors. After the checking process ends, remove-total function 450 updates the borders of ROI—and all lines assumed to contain the bar are not included in the updated ROI.

Separate-window function 452—divides updated ROI to characters 15 based on gross vector 471.

Calc-weight function 454—calculates ROI 11 font threshold. The results of ROI 11 calculations are used later for determining whether each grayscale level belongs to font or to background. The calculation is based on ROI histogram.

Calc-weight function 454 calculates the average value of the histogram, defined as the sum of gray levels in ROI 11 divided by number of pixels in ROI 11. If the average value is too low (below Maximal Gray Level/2) then average between current threshold and Maximal Gray Level is taken as the mean. The final threshold is calculated as 5/4 of the mean.

Pre-process-gross-vector function 456—performs different analysis on gross vector 467:
- removing small areas marked as PROJECTED_SYMB (1) (as was defined in projection table) that can't represent characters 2.
- calculating the average characters 2 width.
- updating internal structures.

Horizontal-slope function 458—calculates two different horizontal slopes as will be defined below. The results of the slops calculation are used later by create-spaces function 460 to divide ROI 11 into spaces.

Figure 6P:
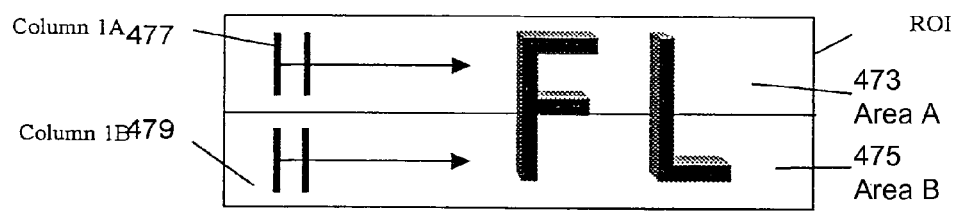
Figure 6Q:
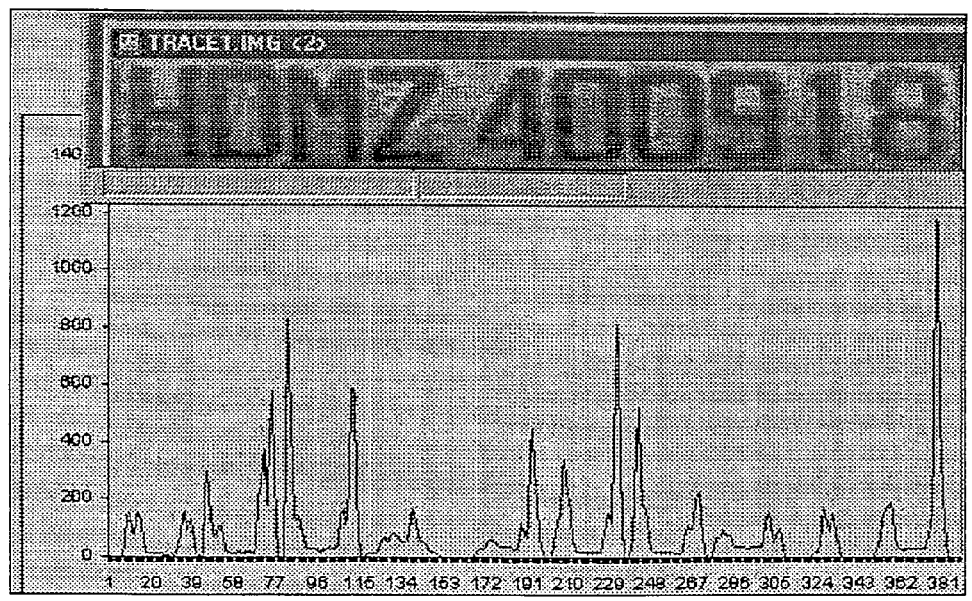
Figure 6R:
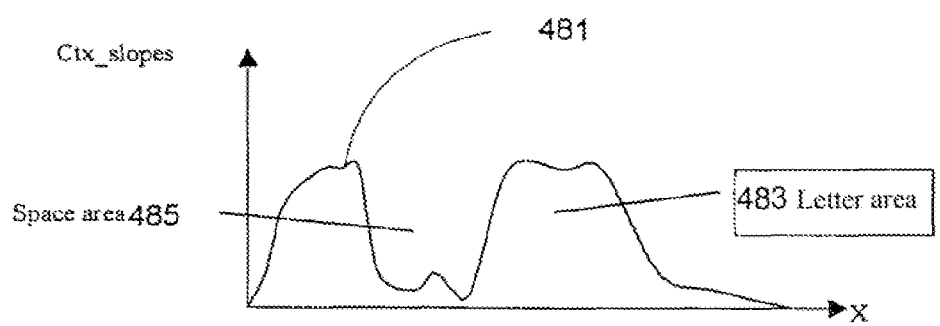

An exemplary slope calculation is illustrated in FIG. 6*p*. ROI 11 is divided into 2 horizontal sub rectangles 473 and 475 comprised of vertical columns one pixel width each. For each column two values are calculated —the sum of horizontal gradients of a column's pixels (within a neighborhood of one pixel), and the same sum of horizontal gradients, but divided by the average column color. For some characters the calculated results will be higher at Area 473 (for example letter F as shown in FIG. 6*p*) and less for some characters at area 475 (for example letter L shown in FIG. 6*p*).
Therefore the maximum of these values represents the final value for the whole column of ROI 11. First column's values will be taken as a maximum between Column 477 values and those of column 479. That way, for each full column in ROI 11, a gradient sum divided by the average column color, and gradient sum not divided by average column color is received. These values of all ROI columns are saved in two vectors marked in the code as "ctx-slopes" and "ctx-no-ave" accordingly.
It should be pointed out that if a column belongs to a space area (between the characters) then value both, ctx-slopes and ctx-no-ave will be zero (or close to zero) while black areas may give high values of ctx-slopes because average color is also small, not just the gradient.
Horizontal-slope function 458 also calculates average ctx-slopes value and smoothes both vectors by averaging neighbor points.

Create-spaces function 460—calculates space positions 465 in target area 1 (as sown in FIG. 6*o*), using slopes values calculated by horizontal-slope function 458. The calculations for finding spaces are based on ctx-slope graph 481 shown in FIG. 6*r*. ctx-slope graph 481 will usually have low values where spaces are positioned (areas 485) and high values where characters reside (areas 483). Create-spaces function 460 also finds low value areas and defines them as spaces. The function performs the search for spaces by locating the minimal value on the graph and expanding it into a space. The coordinates of the spaces found are saved in SEP spaces array. During this stage extra spaces may be deleted on this stage.

Eliminate-side-spaces function 464 analyzes edge noises and eliminate them. A noise is defined by pixel weight of 100 (totally black) and if the distance between it and the next space isn't too big (15 pixels).

Eliminate-using-gradients function 466—eliminates suspicious spaces by analyzing ctx-no-ave vector graph calculated by horizontal-slope function 458. As mentioned, ctx-no-ave vector, records for each column in ROI the sum of vertical gradients (as was described in detail in regards to the horizontal-slope 458 function). It's assumed that suspicious spaces will have high values on ctx-no-ave graph and low values on ctx-slopes 481 graph.

Figure 7A:
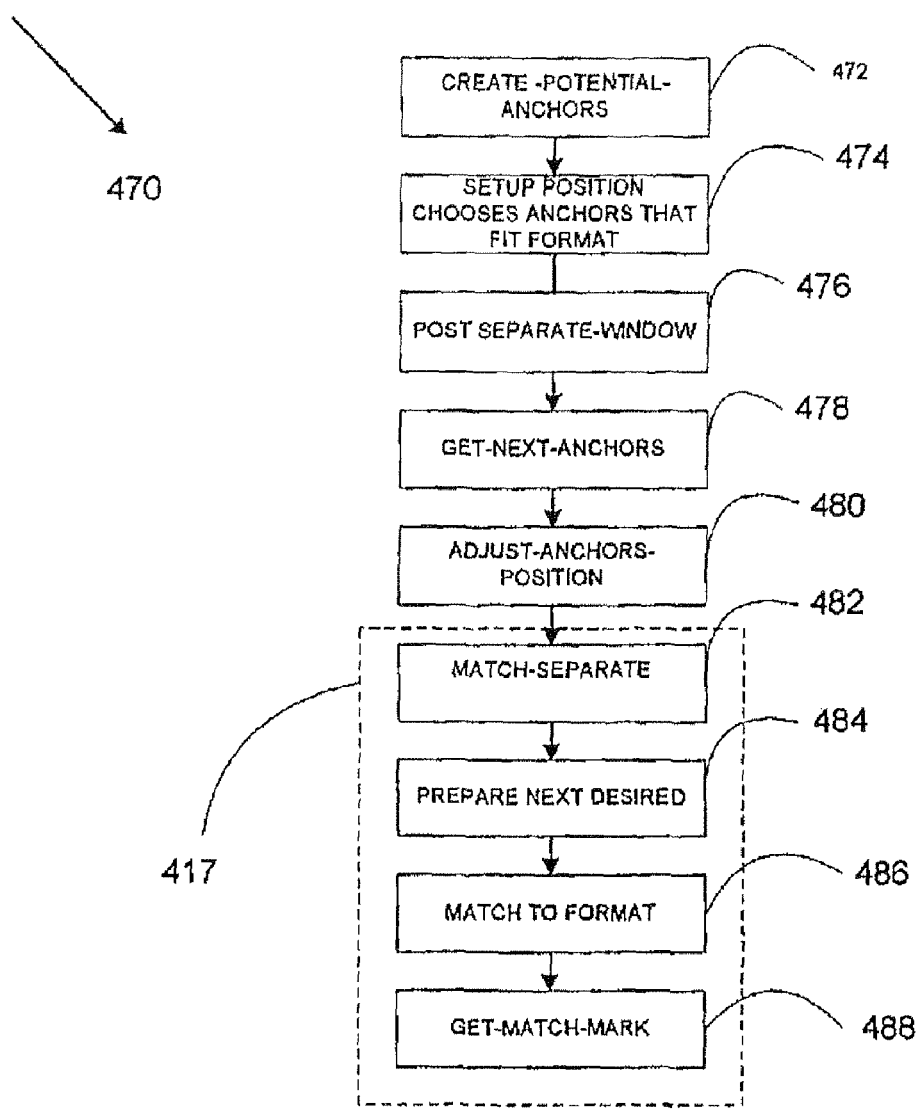
FIG. 7a illustrates a detail flowchart of post separation process.

Referring now to FIG. 7*a*, describing a detailed flowchart of post 15 separation process 470. Post separation process 470 includes different functions, which prepare defined and selected characters 2, and refine them to ensure false safe identification. The result of post separation process 470 is a set of characters 2 ready for identification.

Figure 7B:
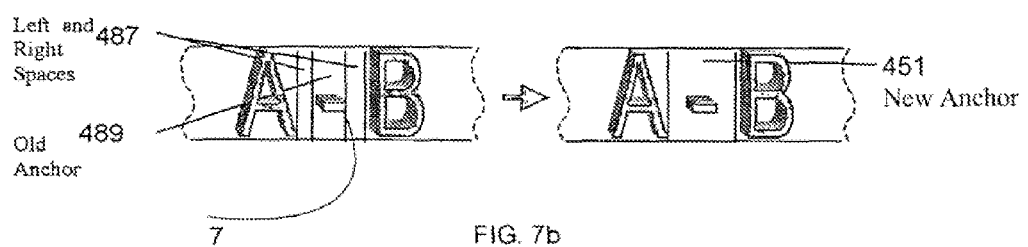
FIGS. 7(b)-(e) illustrates post separation process.

Create-potential-anchors function 472—calculates three different data:
1) potential anchors based on SEPspaces array (calculated by create-spaces function 460 described above)
2) length of character portion without the spaces in-between.
3) average character 11 width in pixels, based on text and length calculations. In addition, spaces 487 surrounding anchor 7 are joined to one another add marked as part of anchor 7 as shown in FIG. 7*b*.

setup-position function 474—chooses anchors 7 that mostly match SF 5. SF 5 includes a number of segments. Each segment has a minimal and maximal number of characters. The pixel length of a segment is calculated based on received data which includes: average character width and space width. The calculation is preformed by the equation below:

$$\text{number of characters} * \text{characters average width} + \text{number of spaces} * \text{space average width}.$$

setup-position function 474 is activated according to two assumptions:
1) Number of spaces is one less than the number of characters.
2) The position of anchors 7 is placed at the end of estimated segment width.

The widest and closest in proximity to this position anchor 7 among the candidates is chosen and defined as the best one.

Post-separate-window function 476—matches SF 5 to the separation result received from setup-position function 474. Post-separate-window function 476 calls get-next-anchors function 478 for receiving a new set of anchors 7, which fits to SF 5 among those anchors 7 found. For each set of new anchors 7 adjust-anchors-position function 480 is called. In addition, match-separate function 482 is called for each result that fit SF 5, to evaluate the quality of match. Finally, the match with the best quality is saved for further processing.

The number of anchors 7 found by the previous functions is sometimes higher than the number of anchor 7 specified in data format 9. For example, six anchors 7 were found while in data format only two anchors 7 are specified. Get-next-anchors function 478 solves this problem. Get-next-anchors function 478 returns all possible pairs of anchors 7 out of six. Each pair of anchors 7 defines a segments between them.

Adjust-anchors-position function 480 analyzes segments, trying to fit them to SF 5, by cutting extra spaces at the edges of each segment. If the fit process is successful activated, identification process 600 is launched.

There are two different cases in which adjust-anchors-position function 480 is activated:
i) There are 2 anchors and as a result 3 segments are defined.
   In this case, the average characters 2 width in the middle segment is calculated. The result of the average characters 2 width calculation is used for calculating the width of edge segments (the number of characters in each segment is already known since they are defined by SF 5). If the edge segments width exceeds the calculated one, the segments are truncated appropriately.
ii) There is only one anchor 7 defined in SF 5, and as a result there are only two segments. In this case the narrowest segment is chosen and the average characters 2 width is calculated. The calculated average characters 2 width value and the number of characters 2 and spaces defined by SF 5 in the second segment are used to calculate the expected segment width. If the second segment is wider than expected, it's truncated accordingly.

Match module 417 perform separation analysis based on spaces calculated during post separation 470 and area enhancement process 300. The object of match format module 484 is to fit the character separation 10 performed earlier to a format defined in data format 9 file. The fit process is activated based on space position input received from post separation process 470. The space positions together with anchors 7 are used to define where the characters 2 are located, and how many characters 2 are in each segment. In other words, match module 417 matches the number of characters (defined by space positions) in each segment based on spaces. If a perfect match is not located, match format module analyzes some of the spaces and removes the suspicious ones. In the case of floating formats i.e. formats which includes segments that have variable number of digits, match module 417 analyzes all the combination of number of digits in each segment. Each combination is checked for relative accordance to the results at hand. The combination with best accordance is chosen as the one that fits the format. The best combination is then sent for identification.

Match Format module includes the aforementioned functions: Match-separate function 482—is the main function of format match module. Match-separate function receives 3 parameters:

1) spaces array 2) enhanced image and 3) minimal characters 2 height. Enhanced image and minimal characters 2 height are used for filtering 30 suspicious spaces.

Match-separate function calls calc-ave-values function for calculating the average width and height of characters 2 and spaces. The average width and height of characters and spaces calculations will be used later for filtering the spaces.

Prepare-next-desired function 484—prepares all possible segment combinations for a floating format. For example a floating format with two segments as shown in table a below, will be summarized by the following table b.

TABLE a

| Segment | Characters in segment |
|---|---|
| 1 | 2-3 |
| 2 | 3-4 |

Table b includes all the possible combinations of the number of characters in segments.

TABLE b

| Segment 1 | Segment 2 |
|---|---|
| 2 | 3 |
| 2 | 4 |
| 3 | 3 |
| 3 | 4 |

If there are more than two segments the number of combinations grows even more. All the combinations, described above, are used one-by-one by the following functions in attempt to fit the current space map to SF 5.

Match-to-format function 486—matches the following parameters:

1) a specific characters combination, received from prepare-next-desired function 484.
2) spaces, provided by separation and post separation processes, in each segment.

As mentioned above, if the match doesn't succeed, some suspicious spaces are discarded in order to better fit the combination.

Match-to-format function 486 outputs a structure of rectangles, each rectangle contains a single letter image ready to be identified by identification process 600. The activation of match-to-format function 486 is based on several assumptions:

1) The number of anchors 7 given is exactly as in SF 5.
2) Characters 2 width is variable, thus characters 2 width value can not be used.
3) There could be only one interrupting space per characters 2 that splits it in two. The function identifies such cases. But if characters 2 are split by two spaces into three parts, the function will not find a solution to this problem.
4) Separation process 400 cannot connect two characters 2 together; it could only split characters 2 in two. Thus it's assumed that the number of characters 2 can only be higher than appeared at the beginning.
5) Spaces array starts from left space before the first characters 2, and ends at right space that comes after the last characters 2

Figure 7C:
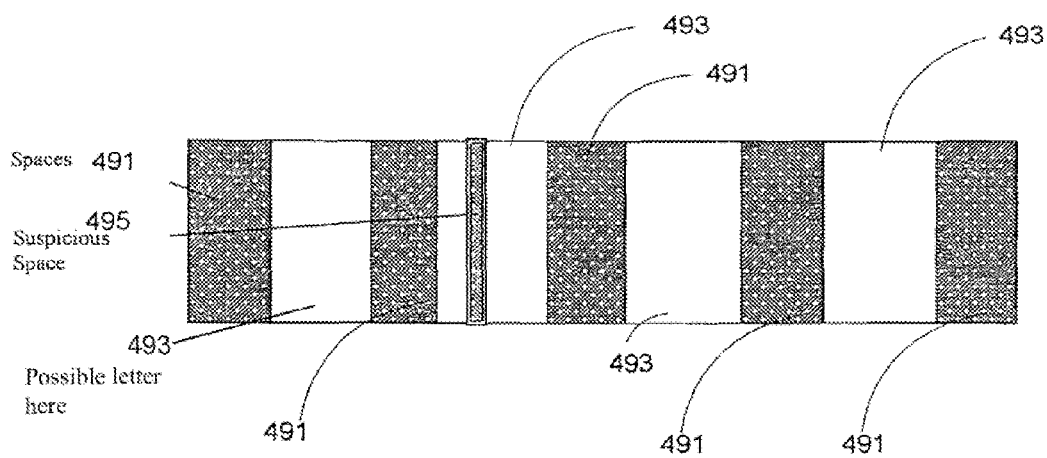

FIG. 7c illustrates an image which includes spaces 491 (marked with dotted rectangles), possible letter holders 493 (white rectangles) requiring identification by match module 484.

FIG. 7c includes only a single segment thus, it should be matched to SF 5 which specifies 4 characters in a segment. As shown in FIG. 7c, there are five letter holders 493 while only four are needed. Therefore the function assumes that a letter was divided by a space and as a result match-to-format function 486 removes extra space 495 enabling a good match between segment and SF 5.

Extra Space 495 (marked by bold border) is deleted since it has a narrow shape, and because it might have many black points on enhanced image. After space 495 is removed, there are only four letter holders left and the function will report a successful match. Since only one space was removed to reach match, the ratio of estimated and final number of characters present in the image analyzed of this match will be rather high.

Figure 7D:
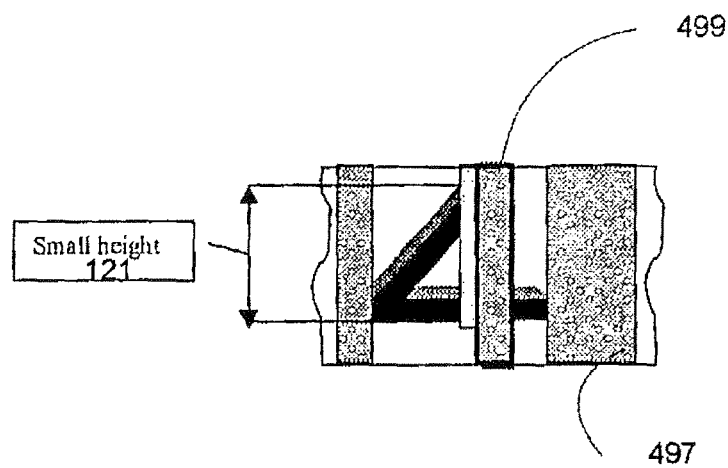

There are several criteria for removing spaces:

1) Spaces with non-zero but small vertical slope are also removed (if they are defined as extra space).
2) Some spaces are removed if they are adjacent to characters 2 with small height. In this case it's assumed that this kind of space divides characters like '4' or '1' into two characters 2.
   As shown in FIG. 7d, digit 'four' 497 is divided by dotted space 499 in the middle (marked with bold border). Space 497 is removed because it's adjacent to remainder 121 of 'four' 497 with small height.
3) Some spaces are removed if they are adjacent from both sides to characters 2 with small width. In this case it's assumed that that this kind of spaces divides characters 2 with holes, like 'O' or 'D' into two characters 2.

Figure 7E:
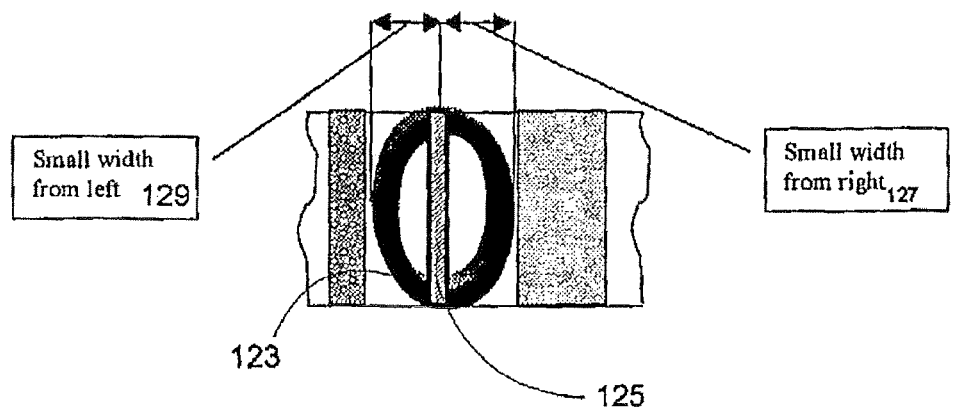

FIG. 7e shows an example of letter 'O' 123 divided in the middle by space 125 (marked with bold border). Space 125, and other similar spaces are removed because they are adjacent to remainders 127 and 129 of letter 'O' 123 with small width, both from left and from right.

Get-match-mark function 488—gives estimation mark to every format fit activated by match process 484. Estimation mark is used later to choose the best format fit combination. The mark estimation is performed according to formula a, and the definitions described below:

$$\text{Mark} = \frac{\text{weight\_ratio} \times \text{num\_of\_symbols} \times 1000}{\text{dev\_height} \times \text{dev\_width}}$$

Formula *a*

Weight-ratio—ratio of black points and white points, calculated using all spaces and all characters 2 data.

Weight-ratio's range—float in range [0;1]. It's closer to 1 if all spaces are white.

Num-of-characters—number of characters 2 in current separation.

dev-height and dev-width—deviations of characters 2 height and width from average characters 2 height and width accordingly. The smaller the deviation, the higher is the mark.

Figure 8A:
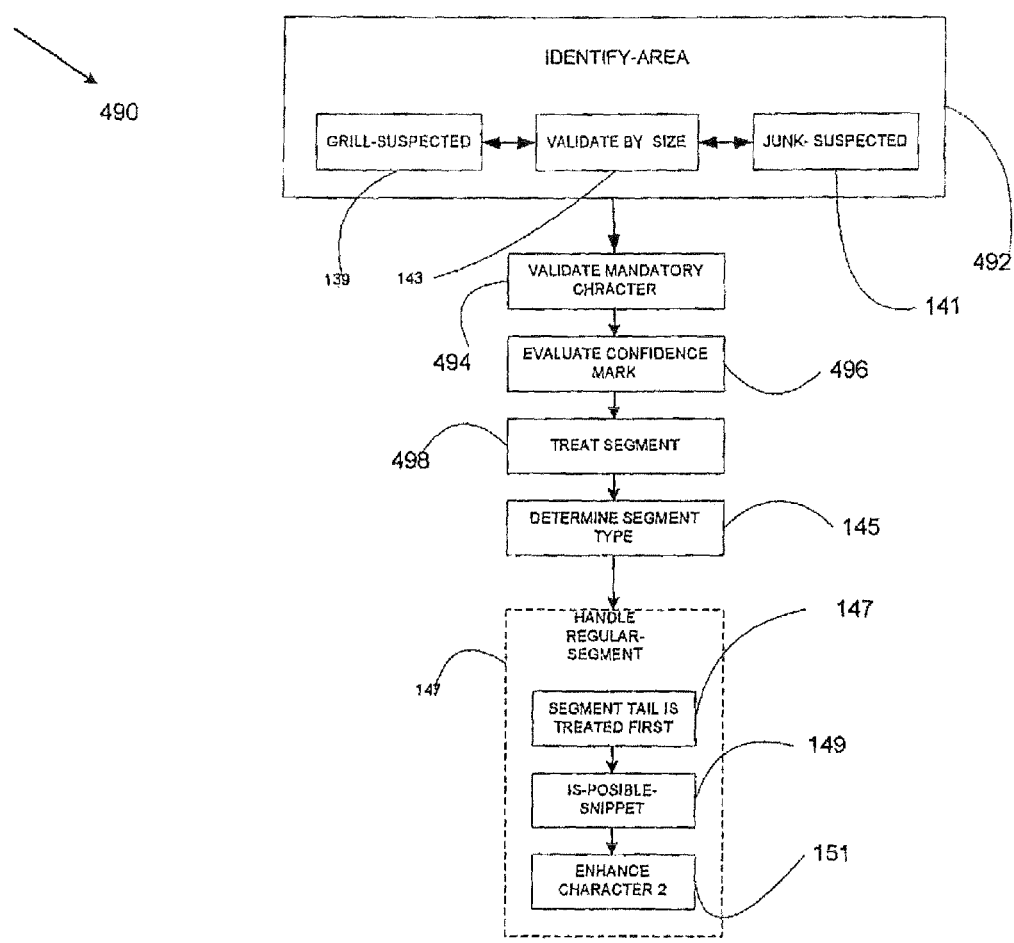
FIG. 8a illustrates a detail flowchart of post match area module.

FIG. 8a is a flow chart of match area module 490 for analyzing characters 2.

The object of match area module 490 is similar to Match Format module 484, i.e. to match given ROI of image to SF 5. However, match area module 484 performs a more sophisticated and detailed analyzing process.

In order to decide whether ROI 11 matches SF 5, match area module 490 activates identification process on specific characters based on SF 5 and data format 9 information.

Figure 8B:
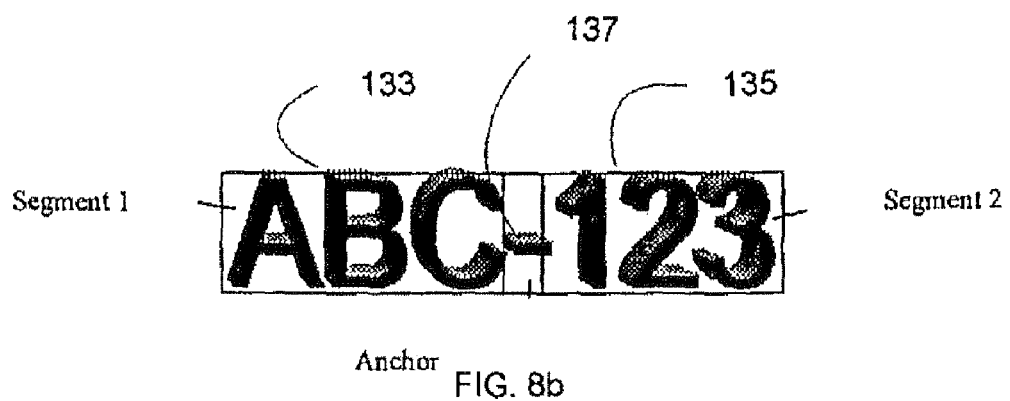
FIGS. 8(b)-(c) illustrates post match area module.

FIG. 8b shows an exemplary SF 5, which includes two segments 133 and 135 separated by anchor 137.

SF 5 has a major role during match area process 490. For example, where characters 2 are recognized, it's possible to define, based on SF 5, if all digits are numbers or letters. Moreover, there can be identification correction based on SF 5. For example, when there is a homogenous segment and all its characters 2 where identified as letters except one that was identified as a number, it's possible to translate that single number into a letter that is similar to it (e.g. 1 to I).

Identify-area function 492—receives 'area' structure as input from match module 484. In addition, identify-area function 492 contains ROI 11 of each format level (maximum 2 levels).

Identify-area function 492 matches target area 1 to a specific SF 5, segment-by-segment, character-by-character.

The matching is activated by scanning, in a loop order, each segment and identifying whether they match SF 5. The identification is activated differently on homogenous and non-homogenous segments.

After the match process is done, identify-area function 492 identifies whether some junk was recognized as a valid characters 2 sequence. For example, a car radiator can be recognized as the number '111111' or as junk near the plate border.

If number (for example a car radiator) is recognized as a valid number it is further analyzed by grill-suspected function 139, while if the number is recognized as junk it is analyzed by junk-suspected function 141.

Both functions (grill-suspected function 139 and junk-suspected function 141) count the number of suspicious characters 2 in the enhanced ROI 11 being identified and if it exceeds some threshold the whole segment recognition is assumed to be wrong.

The criteria for evaluating characters 2 as suspicious are:
Narrow characters 2 (if width<8 pixels)
Invalid dimensions—if width or height are below determined average value, the characters 2 is invalid.
If the characters 2 couldn't be identified at all.
If the characters 2 was partially identified (as will be further explained in Letter Identification process 600, below).

Valid-by-size function 143—removes side junk that still survived all previous filtering. It removes junk by analyzing the geometry properties of characters 2, comparing them to some thresholds, and estimating their deviation from the characters average values.

SF 5 may define some characters 2 as mandatory ones. For example SF 5 can identify the letter "I" as the letter always appearing at the first position and the letter "L", always at second position in an image.

Validate-mandatory-characters function 494 validates that all the required characters 2 are present at their position as they were determined by SF 5.

ECM (Evaluate-confidence-mark) function 496—evaluates the success of the recognition process and grades the accuracy percentage of the output generated. During the evaluation process all problems encountered in the previous stages (enhancement, grosscount, separation, etc.) are considered. In addition, ECM function 496 investigates the status received during identification of characters 2.

There are two neural networks (will be described below) which identify each character. Each neural network might give a different mark, therefore confidence mark takes into account both of neural network identifications. The confidence mark is also reduced by 1 in case the contrast of the picture is low, to prevent 100% mark in case of low contrast.

Mark table for evaluating status marks is specified below:

| Status | Mark | Explanation |
|---|---|---|
| NOTHING: | 0 | No characters was recognized at all |
| REAL_JUNK | 0 | Characters was recognized as junk-after binrizing symbol is too small |
| SEPARATOR | 0 | Separator isn't expected to be a characters |
| ID_BY_SCALE | 30 | Not recognized by first network but the characters boundary is ok (see identification chapter) |
| SIDE_GOOD | 75 | The characters seems good but there is a suspicion that it has a junk line at its side (reminders of plate border) |
| UNKNOWN_SHAPE | 40 | Not recognized by second network |
| INVALID_BOUNDARY | 20 | Boundary is bad but it still may be characters 2 |
| INVALID_HEIGHT | 10 | The height is too big or too low but there is still a hope it's a good characters |
| THIN_BOUNDARY | 10 | See "Letter Identification" chapter for more details |
| THIN & 'I' or '1' | 100 | If the characters is thin and it's '1' or 'I' then it's fully ok. |
| THIN & not 'I' and not '1' | 50 | If the characters is thin but not 'I' and not '1' then it's a problem |

-continued

| Status | Mark | Explanation |
| --- | --- | --- |
| BAD_ID | 30 | The status couldn't be determined during the identification process |
| KOREAN_CONNECTED | 70 | Special case for Korea. Not used meanwhile |
| BAD_DIF | 60 | Characters characteristics (features) are extractable but unrecognizable |
| QUITE_GOOD | 90 | The estimation of both networks is <60 but is the same |
| All the rest | 100 | The characters was recognized without any problems |

In addition to mark table, reduction table, described below, is used for reducing the values marks received from mark table. Reduction marks are based on previous observations:

| Reduction of Mark | Explanation |
| --- | --- |
| −25 | When a homogenous segment wasn't recognized as such |
| −(Repaired * 10) | Each repaired characters costs 10 points |
| −(Problems * 5) | Each problem during separation costs 5 points |
| −1 | Prevent mark 100 in case of low contrast |

Figure 8C:
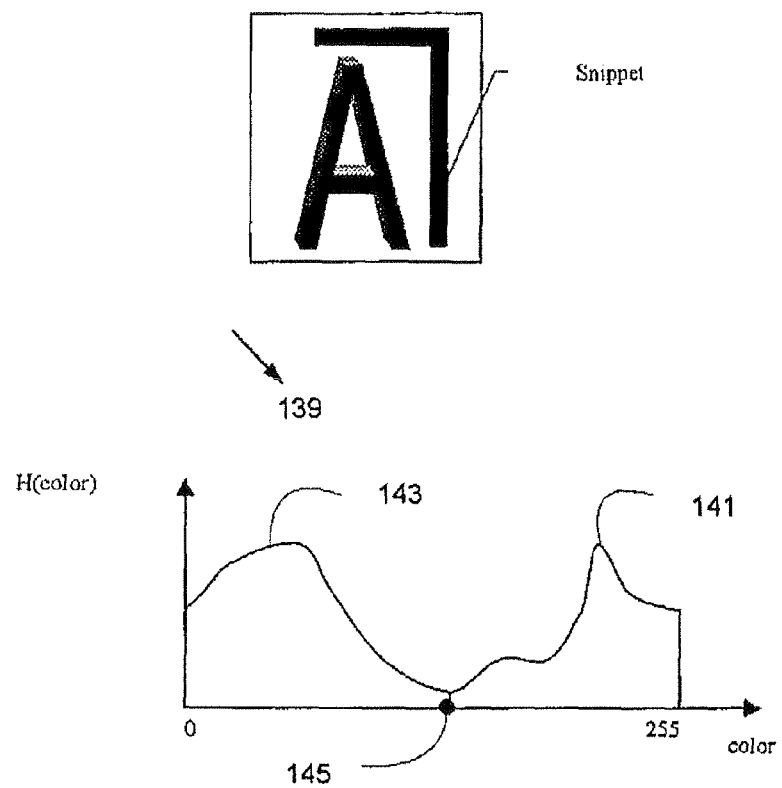

SF 5 defines co-dependencies between segment types. For example, it can specify that if the type of homogeneous segment 1 is recognized as numbers only, then the type of segment 2 must also be numbers only. When the type of the current segment is recognized, the second step is to analyze the segment dependencies—if some of the following segment types depend on the recognized type of the current segment, these segment types are updated accordingly.
As mentioned above, identify-area function 492 goes over each level and each segment and matches it to SF. Treat-segment function 498, analyzes homogenous segments found by identify-area function 492, and determines the actual segment type using determine-segment-type function 145 (which will be discussed later). Treat-segment function 498 accumulates the number of faults, found for each characters 2 recognized, and if the total number of faults is more than one, CRP 10 fails.
DST (Determine-segment-type) function 145—identifies each character 2 in a segment and calculates its type i.e. how many characters 2 were recognized as digits and how many characters 2 were recognized as letters. In addition DST function 145 activates a counter for those characters 2 whose type could not be recognized.
At the end of the identification process DST 145 function compares the letter and digit type counters.
Handle-regular-segment function 147—operates different functions:
1) If the type of digits in segment tail is defined in SF 5, they are set in data structures. But, if tail type is defined as homogenous, then DST function 145 is called to determine the exact type of the segment.
2) Segment letter types (digit or letter) are copied from SF 5 to the internal structures. The type of characters 2 that aren't mentioned in the format are set as UNKNOWN.
3) Is-possible-snippet function 149 is called on the first and the last characters 2 to determine if characters 2 are adjacent to a black frame or to the remainders of characters 2.
4) enhance-characters function 151 is activated for the current character 2. enhance-characters function 151 stretches the characters 2 diagram using a technique similar to that applied by stretch area function 360, excluding stretch limits definition.
5) Enhance-characters function 151 function applies a high pass filter to the characters image and calculates a threshold for image binarization. This threshold is used to separate characters 2 from background—all the points with grayscale level below threshold are set to black and all those above are set to white color.
6) After histogram stretching and application of high-pass filter there should be two peaks on the histogram and the threshold is chosen at the minimum of the histogram. FIG. 8c illustrates received histogram 139, after stretching and high pass filter were activated on characters 2. Histogram 139 includes two peaks 143 and 141 and minimum 145 chosen to be threshold.
7) After binarization process is activated on characters 2 the characters 2 are enhanced and sent to identification process 600.

Figure 9A:
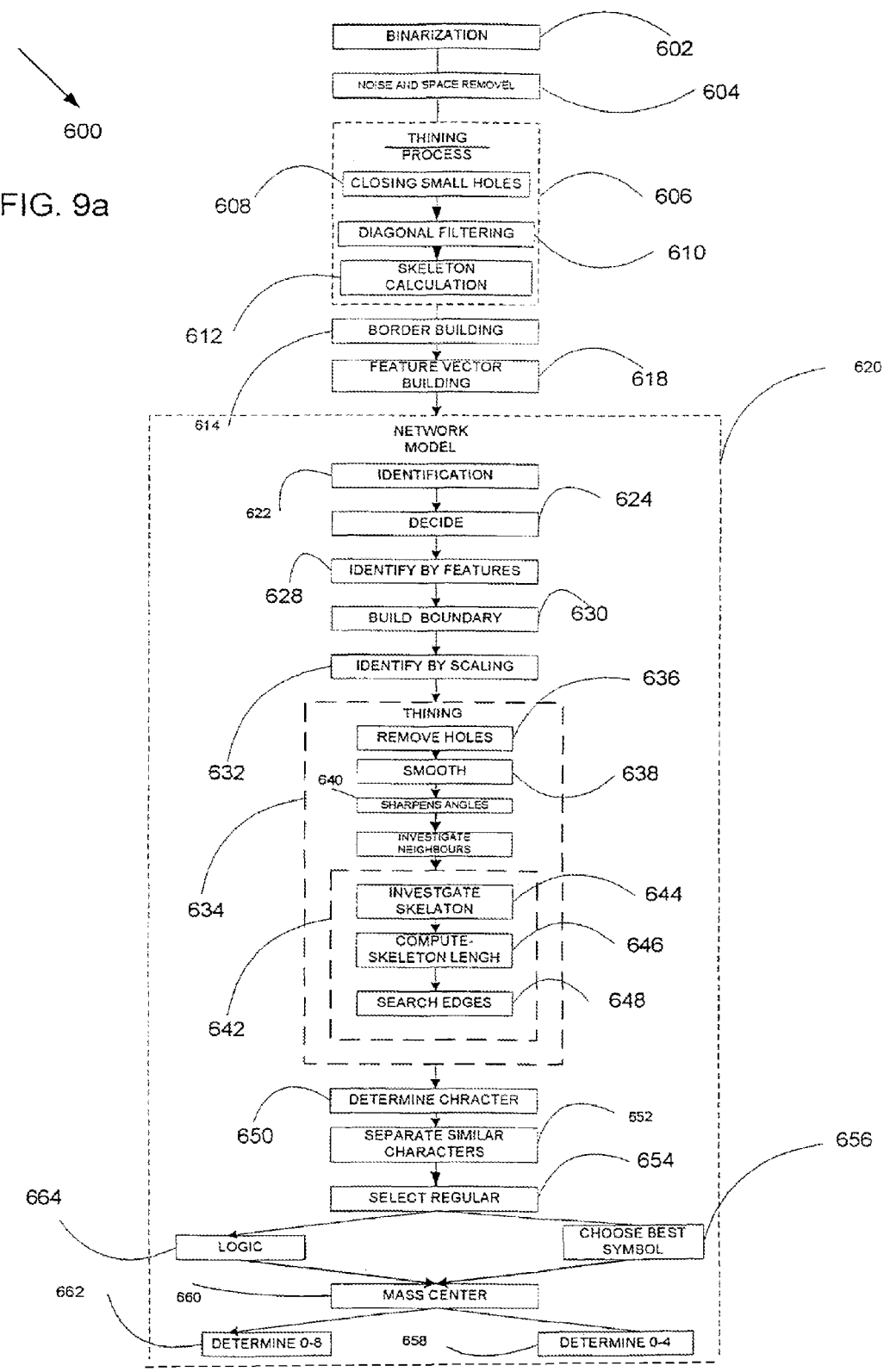
FIG. 9a illustrates a detail flowchart of character identification process.

FIG. 9a illustrates a detailed flowchart of character identification process 600 of FIG. 2, for identifying single characters and fitting current separation of characters to a SF 5. At previous stages the exact location of each character was calculated. It was enhanced, purified and binarized. Identification process 600 is activated using the following mechanisms:
General neural networks (there are two types of networks, which will be illustrated below).
Special letter features network—there are several networks, each network is used for identifying similar characters 2 (e.g. 'UVYW' or '8B' or '1I')
Special logic procedures to identify similar characters by checking the difference of characters feature.
Both neural networks are trained in off-line training programs that use as input data a set of multiple cases of each letter or digit. All cases include the desired result, and the training program uses the input to optimize the results. The program also injects 'noise' to create a layer set of inputs, and make the networks more immune to 'noise'.
There are two types of neural networks:
1) Identification by features—the network is fed with Fourier transform 25 and other features based on the original size binarized letter matrix.
2) Identification by scaling—the binarized characters 2 matrix is scaled to size 12×8 and its contents (96 points) are used as the input of the network.
Identification process 600 features the following stages:
1) Binarization 602—original enhanced character matrix is binarized using binarization threshold 145 as explained in FIG. 8c above.
2) Removal of noise and spaces 604—all the stand-alone characters 2 are removed together with the edge lines containing background only.

3) Thinning process 606—removes black filling of characters 2, by leaving only the edge pixels of characters 2 font.

Thinning consists of the following sub processes:
 a) Closing small holes 608—small areas of white points surrounded by black points are blackened.
 b) Diagonal filtering 610—emphasize diagonal components of different types of characters.
 c) Skeleton calculation 612—calculates the edge contour of characters 2. As a result characters matrix contains '1' for font pixels at the border of the characters 2, and '0' everywhere else. For example, for a matrix corresponding to letter 'O,' external and internal contours of the letter 'O' can be marked with '1' and '0' at the background of the letter.
4)

FIG. 9*b* illustrates border 603 build by border building 614 around number 'one' 605.

5) Features Vector Building process 618—builds Feature vector for characters matrix, thus enabling characterizing a given character matrix by a set of features. neural network module 620 uses Feature Vector to distinguish between the characters 2.

Features Vector Building process 618 includes hereinabove characterizations:
 a) ratio of black to white points
 b) sum of black points
 c) number of black points in every quarter of the matrix
 d) center of mass of black points
 e) number of transitions from black to white in some directions As mentioned before, there are two neural networks that perform characters identification 600.

Neural Network model 620 is capable of determining the general form of characters 2. Although characters 2 that are similar can't be separated by Neural network 620, Neural Network model 620 can tell well the difference between characters 2 that are different from one another to a degree. Thus, Neural Network 620 can detect groups of similar characters 2 like 'VWYU', '1I', '5S', '2Z', '8B', etc.

Figure 9C:
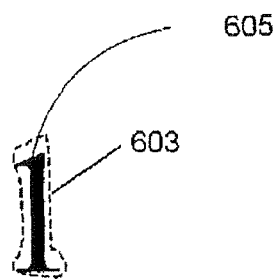
FIGS. 9(c)-(r) illustrates character identification process.

FIG. 9*c* illustrates Neural Network model 620 structure. Neural Network model 620 inputs are actually coefficients. These are the first several coefficients of the Fourier transform calculated over characters 2 boundary. The outputs are the groups of similar characters 2 that Neural Network model 620 can't distinguish between.

Neural Network model 620 consists of neurons 611 and synapses 613 that connect neurons 611 together. Each neuron input and hidden layers is interconnected by synapses 613 with all the neurons of the following layer. Each neuron 611 sums up all the numbers received from the appropriate synapses 613 and multiplies them by predefined weight, which differ from neuron to neuron.

Figure 9D:
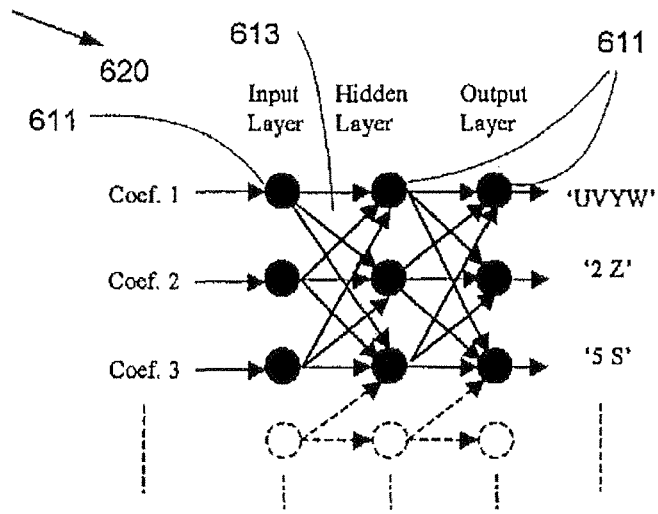

FIG. 9*d* shows an exemplary addition operation activated on neurons 611.

Neuron 611 receives inputs 'A', 'B' and 'C' by synapses 617, 619 and 621 respectively. Inputs 'A', 'B' and 'C' are summed and multiplied by predefined weight W, therefore output D is:
D=(A+B+C)*W It should be mentioned that Neural Network model 620 structure remains the same. Various networks differ only by W (weights) assigned for each neuron. Weights are calculated off-line by feeding the network with sets of known inputs and known outputs, each time. In addition weights are updated, thus during Neural Network model 620 simulating with inputs, Neural Network model 620 will generate values closest to the expected outputs.

Figure 9E:
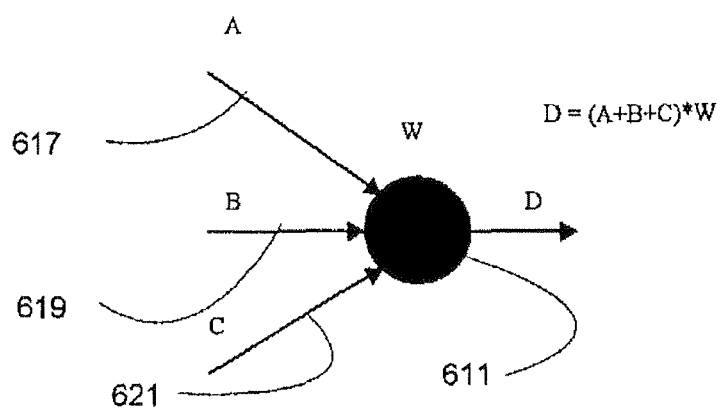

Since Neural Network model 620 has several inputs and several outputs it can be represented as a multi-dimensional function from inputs to outputs. FIG. 9*e* shows characters 625 and group of characters 623 assigned with a special area 627 in a multi-dimensional graph 629.

Network simulation includes two steps:
1. hidden layer values are calculated based on the inputs.
2. outputs are calculated based on the hidden layer values calculated in the previous step.

When a new characters 2 arrives for identification, its inputs are mapped into multi-dimensional graph 629 as a single point with N coordinates. The algorithm chooses area 627 closest to the point and this area represents the identification of character 2. For example the area closest to characters 625 is group '2 Z' area 631, thus characters 625 will be identified as belonging to group '2 Z'. If the point is too far from any area 627 network will not be able to identify characters 2.

All of the neural networks in the system are based on the process described in FIG.s 9*c* 9*d*, and 9*e*. The networks differ only in the number of input and outputs and the weights assigned to each neuron. These differences divide the neural networks used in the system into several types.

There are two main types of neural networks characterized by the nature of inputs received by the networks. The first neural network receives a Fourier transform and Features input, and the second neural network receives a scaled characters matrix input.

The first type of network has Fourier transform and Features input. As mentioned before the closed boundary around characters 2 represented by the character matrix are calculated. Then several first coefficients of Fourier transform (limited by some low frequency threshold) are calculated. These coefficients serve as the first part of the network input.

The second part is the Feature Vector. Feature Vector Building from the matrix is defined as features extraction process. There are different features extraction for different groups of similar characters 2 since each group can be separated based on different features. For example characters '8' and 'B' differ mostly on their left part while the right part of both characters are the same. Thus, in this case it may be helpful to extract some features only from the left side of the characters matrix and feed them to the network that knows how to separate these two, almost similar characters 2.

This kind of network knows well how to distinguish between different forms 6*f* characters 2 (since different form will have different coefficients). However, similar characters, like '2' and 'Z' have almost similar Fourier transform coefficients for their boundaries and therefore they will always be mapped to the same area.

To distinguish between these similar characters 2 it is necessary to calculate special features for Features Vector characterizing, thus detecting the differences between similar characters 2.

The second type of network is activated when the first network fails to recognize the characters 2. The second type of network receives a scaled characters 2 matrix as an input.

In addition to the two aforementioned networks, there are various logic procedures that separate similar characters 2 received from the networks, by analyzing the binary matrix of the characters 2. The features extracted depend on the characters analyzed.

The types of the neural networks are summarized in the table below:

| Network ID | Type | Network outputs | Network inputs | Comments |
|---|---|---|---|---|
| 0 | DIGIT | From 0 to 9 | Type 1 (Fourier coeff. + Features vector) | Determines which digit is the given characters |
| 1 | LATIN | B, C, D, E, F, K, L, M, N, P, R, U, W, A, Z, S, H | Type 1 | Determines which Latin letter is the current characters |
| 2 | FONTA | 0, 1, 2, 3, 4, 5, 6, 7, 8, 9, A, B, C, D, E, F, G, H, I, J, K, L, M, N, O, P, Q, R, S, T, U, V, W | Type 2 (matrix 12 × 8) | Determines Chinese hieroglyphs according to the external table |
| 3 | FONTB | 238 ('mem'), 246 ('tsadik') | Type 1 | Determines Israel characters 'mem' and 'tsadik' |
| 4 | FONTC | | | Reserved |
| 11 | KOREA2 | From A to N | Type 2 | Determines Korean hieroglyphs according to the external table |
| 13 | DIGIT2 | From 0 to 9 | Type 2 | Determines which digit is the given characters |
| 14 | LATIN2 | B, C, D, E, F, K, L, M, N, P, R, U, W, A, Z, S, H | Type 2 | Determines part of the Latin characters |
| 15 | DLMIX | MIX_IS_DIGIT, MIX_IS_LATIN, MIX_IS_BOTH | Type 1 | Distinguish letter from digit |
| 16 | DLMIX2 | MIX_IS_DIGIT, MIX_IS_LATIN, MIX_IS_BOTH | Type 2 | Distinguish letter from digit |
| 17 | DIF5S | 5, S | Type 1 with overloaded features | Distinguish 5 and S |
| 18 | DIFZ2 | Z, 2 | Type 1 with overloaded features | Distinguish Z and 2 |
| 19 | DIFB8 | B, 8 | Type 1 with overloaded features | Distinguish B and 8 |
| 20 | DIFD0 | D, 0 | Type 1 with overloaded features | Distinguish D and 0 |
| 21 | DIF4A | 4, A | Logic procedures | Distinguish 4 and A |
| 22 | DIF4L | 4, L | Logic procedures | Distinguish 4 and L |
| 23 | DIF6G | 6, G | Logic procedures | Distinguish 6 and G |
| 24 | DIF6A | 6, A | Logic procedures | Distinguish 6 and A |
| 25 | DIF3J | 3, J | Logic procedures | Distinguish 3 and J |
| 26 | DIF13 | 1, 3 | Logic procedures | Distinguish 1 and 3 |
| 27 | DIFUVY | U, V, Y | Logic procedures | Distinguish U, V and Y |
| 28 | DIF17 | 1, 7 | Logic procedures | Distinguish 1 and 7 |
| 29 | DIF7T | 7, T | Logic procedures | Distinguish 7 and T |
| 30 | DIFTHIN | 1, 7, I, T | Logic procedures | Distinguish 1, 7, I and T |
| 31 | DIF469 | 4, 6, 9 | Logic procedures | Distinguish 4, 6 and 9 |
| 32 | DIFIJLT | I, J, L, T | Logic procedures | Distinguish I, J, L and T |
| 33 | HKMNWX2 | H, K, M, N, W, X | Logic procedures | Distinguish H, K, M, N, W and X |

Functions responsible for identification process 600 will be discussed herein:

Identification function 622—starts identification process 600. Identification function 622 initializes and performs analysis of the type of characters 2 assigned to it by match module 417. If it isn't clear whether characters 2 is a digit or a letter, DLMIX network (described in column 15 by the above network table letter) is activated for identifying whether the characters 2 is a letter or a digit.

The following tables describe different cases where there is a big similarity between letters and digits:

TABLE A

| Letter | Similar Digit |
|---|---|
| A | 6, 4 |
| B | 8 |

TABLE A-continued

| Letter | Similar Digit |
|---|---|
| C | 6 |
| D | 0 |
| G | 6 |
| I | 1 |
| J | 3 |
| L | 1, 6 |
| O | 0 |
| Q | 0 |
| S | 5 |
| T | 1 |
| Z | 2 |

TABLE B

| Digit | Similar Letter |
|---|---|
| 0 | D, O, Q |
| 1 | I, T, L |
| 2 | Z |
| 3 | J |
| 4 | A |
| 5 | S |
| 6 | A, G, C, L |
| 8 | B |

| Digits without a pair |
|---|
| 7, 9 |

TABLE D

| Characters without a pair |
|---|
| E, F, K, M, N, P, R, U, V, W, X, Y |

DLMIX neural network identification process succeeds in cases where letter or digit has no similar pair (as described in tables c and d above).

However there are characters 2 which are similar to other characters 2, a fact which makes it hard to decide whether characters 2 is a digit or a letter (as described in the tables a and b shown above). In this case two additional networks are used: DIGIT and LATIN network. Each network decide which digit and which Latin letter current characters 2 represents, while the final decision between the two decisions is performed by decide function 624 which applies additional neural networks to separate the similar pairs.

Figure 9F:
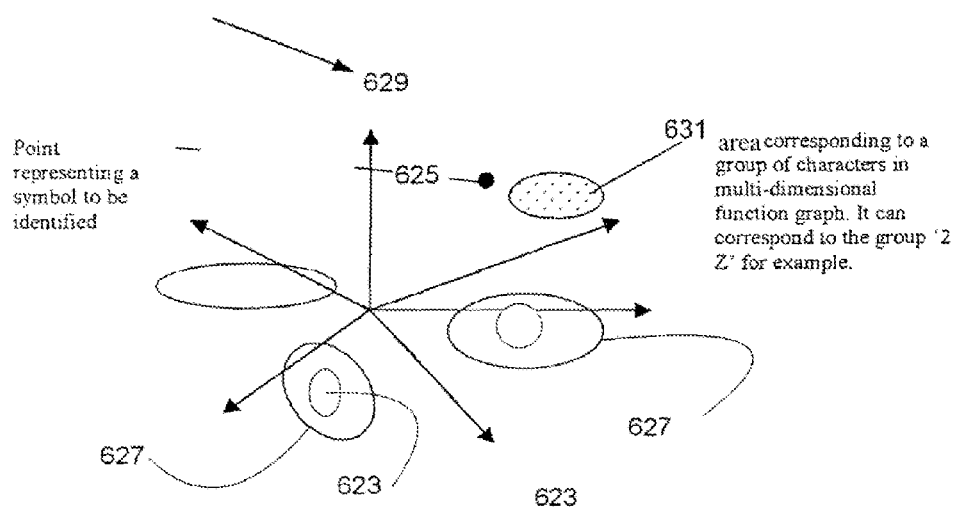
Figure 9G:
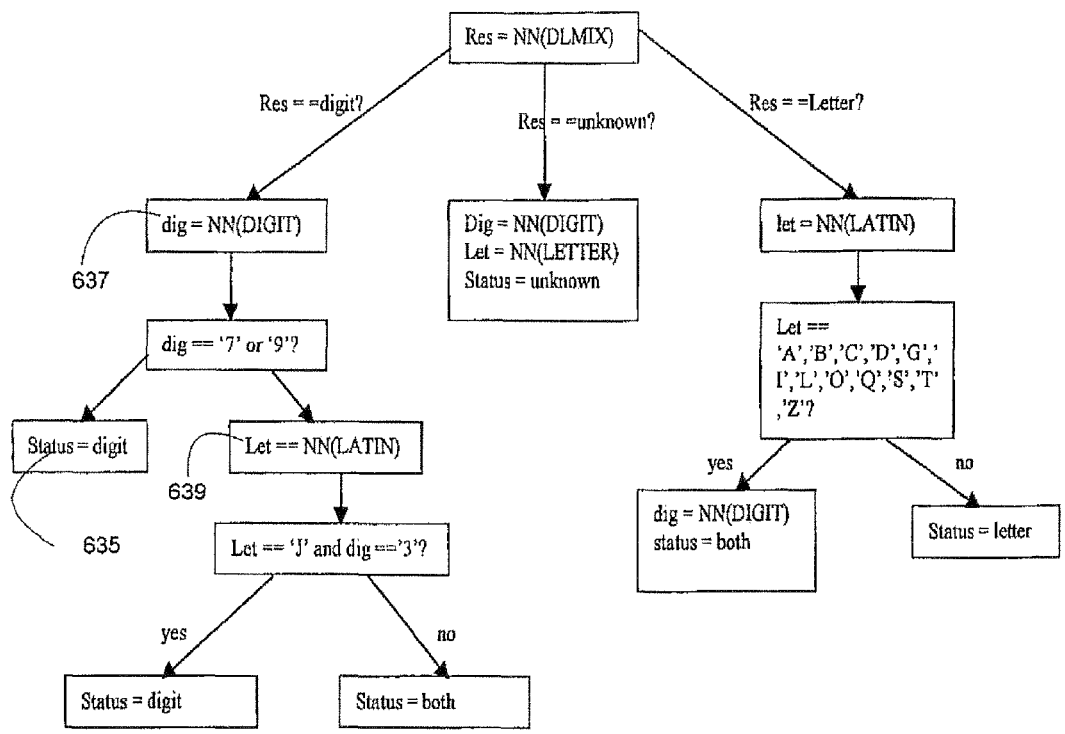

FIG. 9g illustrates the connection between DIGIT, LATIN and DLMIX networks.

Status 635 specifies whether a given characters 2 was determined by the appropriate network as a letter or as a digit. Variables 'let' 637 and 'dig' 639 contain the identification result of the appropriate networks. DLMIX network can only tell if a given characters 2 is a digit a letter or both while Latin and DIGIT networks can specifically tell which letter or digit it is.

FIG. 9f specifies a top-level call tree of different functions participating in the identification process of a single characters 2.

Figure 9H:
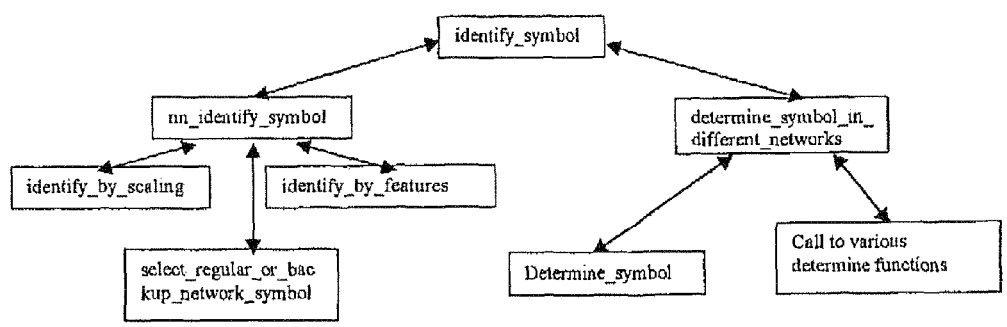

IBF (Identify-by-features) function 628 calculates features serving as an input to the neural network. IBF function 628 uses binarized image matrix and builds the boundary of the characters 2 according to the following steps:
  a) calculates the Fourier transform coefficients that will be used as the input to the neural network for further identification.
  b) Analyzes the inputs created in the previous step by using decision trees to eliminate characters 2 which can not be identified. The elimination is based on specific Transform Fourier coefficients. Decision tree is activated only for neural networks whose ID<17 (see the network table above). There are several decision trees used:

1) decision_tree_digits - analyzes Fourier transform coefficients
2) decision_tree_latin -- analyzes Fourier transform coefficients
3) decision_tree_fonta - currently empty
4) decision_tree_fontb - currently empty
5) DIF17
6) DIF7T FIG. 9h shows an exemplary characters boundary 641, built around letters 'Y' and 'O' by activating build-boundary function 630. characters 2 boundary is needed for Fourier transform to work properly.

Build-boundary function 630 performs the following steps:
  1) The border building starts by finding black pixel with white neighbors. It is assumed that there is more than one border (since characters 2 consist of several separate pieces) thus, after the first border is built, another black pixel with white neighbors from various directions is found each time in order to search and build another characters 2 border.
  2) When the first black pixel with white neighbors is found it is used as a start point for clockwise border building. Border building is performed in a way somewhat similar to the method of passing through a labyrinth by always touching the right wall. Clockwise border building includes 15 the following steps:
    a) start to move in the right direction from the first pixel
    b) Each time a black pixel in the current direction is found, a 90 degrees anti-clockwise change in direction is performed.
    c) Each time a white pixel is found in the current direction, a 90 degrees clockwise change of direction is performed
    d) Stop when the starting pixel was reached—as a result border is closed All the white pixels visited will represent characters 2 border.
To avoid race conditions:
  The characters 2 area is surrounded with white pixels
  The border length is limited to prevent circles
When the boundary is received it's examined for validity:
  If it's too short or too long it's discarded
  If it's high and thin—it may be accepted if no other normal boundary is found since it may represent '1' or 'I'

As shown in network types table above, there are type 2 and type 1 neural networks. Type 2 neural networks are activated as backup networks. Usually both types of networks are activated and the best result is chosen according to the statuses received from the networks.

While type 1 networks receive Fourier transform coefficients and some additional features, type 2 networks receive a scaled matrix of characters 2 as an input. The scaled matrix is always of size 12×8, which means there are 96 inputs, each can be '0' or '1'. The scaled matrix is thinned before it's fed to the network so it contains just the scaled contour of characters 2.

In the next step a decision tree function scale-dec-tree is called. Scale-dec- tree function activates primary analysis on scaled characters 2 matrix and eliminates the impossible results.

Figure 9I:
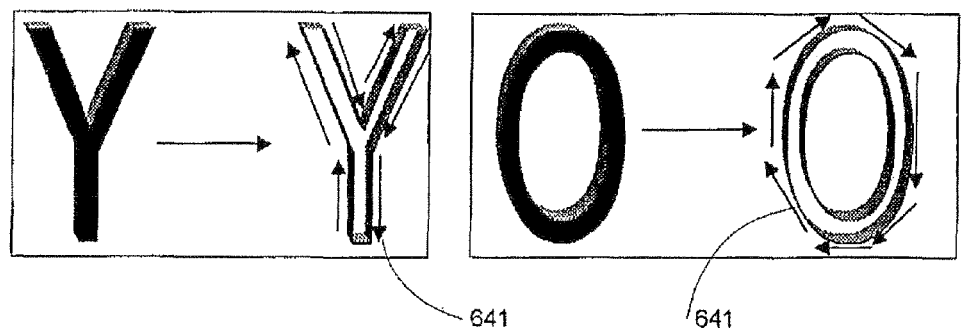

Thin function 634 performs both thinning and preprocessing. Thinning means that a full matrix is translated into a matrix that contains just a contour of the characters 2 as shown in FIG. 9i.

Figure 9J:
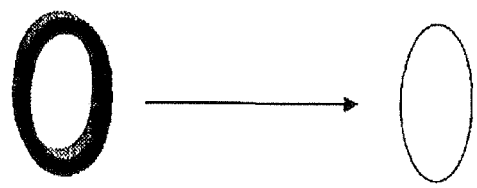

Thinning process includes the following stages:

1) Remove-holes function 636 -removes small white holes 643 that can be part of the characters 2 body as illustrated in FIG. 9j. Holes 643 may appear after color inversion of the image.

The algorithm for finding small holes includes the following steps:

Scanning all vertical lines in characters 2 matrix.

For each line finding all the short continuous white intervals between any two black points and marking them.

Scanning all horizontal lines and finding all white intervals between two horizontal points Examining the intersection of short horizontal and vertical white intervals and if the height and width of these intersections is small—blackening them.

Figure 9K:
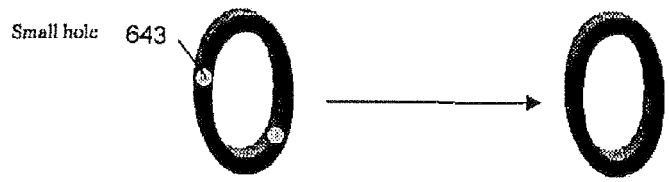

2) Smooth process 638—removes sharp edges 645 of the characters 230 matrix as shown in FIG. 9k. Smooth process 638 algorithm includes the following steps: each black point of the characters 2 matrix is examined. If it has less than 3 black neighbors and its connected to at most one neighbor —this pixel is whitened. As a result, stand-alone black pixels or pixels that represent thin short sharp edges 645 are removed.

3) Sharpens-angles function 640 —sharpens the angles of the characters 2 in matrix. Sharpens —angles function 640 performs horizontal lines scan of the matrix. During each scan it matches predefined bad angle patterns to the matrix area scanned. The match is done using patterns 647,649 and 651 shown in FIG. 9l. If there is a match, the angle is sharpened in a way that fits the pattern matched. There is also a second test, which performs horizontal bottom-up scan and fits a vertical mirror to patterns 647,649 and 651.

Figure 9L:

Characters 2 '#' '.' '0' 'X' and '*' shown in FIG. 9l are defined as follows:

—current characters 2 scanned in the characters 2 matrix.
.—should be white.
0—at least one 0 of the group should be white. In "is_d2_match" at least one column in the group should be white (two vertical white pixels are required).
*—should be black.
X—don't care.

Patterns 647 649 and 651 shown in FIG. 9l represent bad angles that can be found at the bottom of characters such 'V', 'W' and in the middle of 'X', etc. Horizontal mirrors of patterns 647 649 and 651 could be found in characters 2 such 'M', 'A', 'N', 'K', 'X', etc.

4) Investigate—neighbors function 642 investigates the neighbors of each black pixel and if there is not enough of them, the pixel is whitened.

Figure 9M:
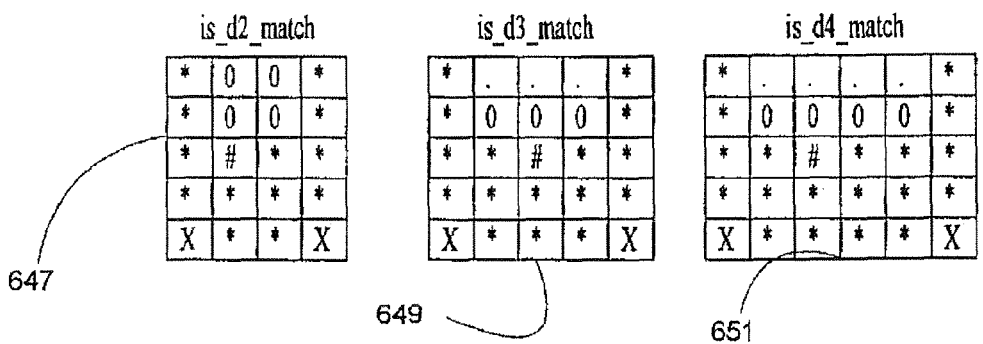

5) Investigate skeleton function 644 investigates the skeleton received after the previous step is activated. Investigate skeleton function 644 removes short black chains from skeleton according to the following steps:

a) The length of the skeleton is calculated using compute-skeleton-length function 646.

b) Skeleton edges are searched for. An edge is defined as any black point with only one black neighbor. For each edge which was found step iii) is performed. This step is repeated until no new edges can be found.

c) The neighbors of the edge are searched for. Each neighbor found becomes the base of the search for the next neighbors as shown in FIG. 9m. Pixels which were visited are not considered to be neighbors anymore. This distinction ensures that the search process will advance till the next edge is met. Starting edge 653 has one neighbor while ending edge 655 has none, since its neighbor was already visited before the ending edge was reached.

d) The length of the intervals between the edge points is calculated. It's defined as the number of black points that the interval consists of. If the interval length is less than 5% of the total skeleton length the interval is considered to be short and is removed (whitened).

Determine-characters function 650 calls identify-by-features and identify-by-scaling for separating similar digits or similar characters (but not mixes characters and digits). In addition, determine-characters function 650 calls one of the functions from a list of functions (described below) according to the characters that need to be separated. Some of these functions call each other and some call to the neural networks (see the networks table above). The following table shows the relationship between the different functions

| Function | Calls function(s) | Calls Network(s) |
|---|---|---|
| determine_6_9_4 | Determine_9_4 | DIF469 |
| determine_9_4 | | |
| determine_3_0_1 | determine_1_3 | |
| determine_1_3 | | DIF13 |
| determine_5_6 | | |
| determine_5_3 | | |
| determine_7_2 | determine_7_1 | |
| determine_7_1 | | DIF17 |
| determine_0_8 | determine_0_4 | |
| determine_0_4 | | |
| determine_9_8 | | |
| determine_2_4 | | LATIN, LATIN2 |
| Determine_thin_digit | determine_1_3 | |
| Determine_I_T_L_J | | DIFIJLT |
| determine_C_G | | |
| determine_C_E | | |
| determine_D_O_Q_A | | |
| determine_K_X | | |
| determine_A_M | | |
| determine_R_N | | |
| determine_R_M | determine_R_N | |
| determine_F_R | | |
| determine_T_F | | |
| determine_H_K_W | | |
| determine_U_V_Y | | DIFUVY |
| determine_H_W | | |
| determine_N_W | Always returns 'N' | |
| determine_D_B | | |
| determine_M_W_H_N_K_X | determine_K_X | HKMNWX2 |
| determine_U_V_Y_W | determine_U_V_Y | |
| determine_E_L | | |
| determine_D_O | determine_Q_O | |
| Determine_Q_O | | |
| determine_thin | determine_1_I_T | | functions that don't call other functions or networks, separate characters 2 by directly analyzing the characters features.

Separate—similar function 652 separate between similar characters and digits. It's called when there are two candidates for the final choice—one is a letter and another is a digit. The following table illustrates the possible cases:

| Digit | Letter | Separation Function |
|---|---|---|
| 0 | J | determine_0_J |
| 0 | C | determine_0_C |
|   |   | determine_D_O |
| 0 | G | determine_0_G |
| 0 | A | determine_A_4 |
| 1 | Not F and not N | determine_thin |
| 2 | Z | determine_Z_2 |
| 3 | J or I | determine_3_J |
| 3 | S | determine_3_S |
|   |   | determine_S_5 |
| 4 | A | determine_A_4 |
| 4 | L | determine_4_L |
| 4 | J | determine_4_J |
| 4 | Q | determine_4_Q |
| 4 | O or B | determine_0_4 |
| 5 | S | determine_5_S |
| 5 | G | determine_5_G |
| 6 | A | determine_6_A |
| 6 | E | determine_6_E |
| 6 | G or C | determine_6_G |
| 7 | T | determine_T_7 |
| 8 | P | determine_8_P |
| 8 | B or H or G | determine_D_B |
|   |   | diff_by_features(DIFB8) |
|   |   | determine_B_8 |
|   |   | determine_8_B |
| 8 | R | determine_8_R |
| 8 | G | determine_8_G |
| 8 | A | determine_8_A |
| 9 | A | determine_9_A |

As shown in networks table above, there are two basic types of networks: type 1—based on Fourier transform coefficients and type 2—based on the scaled matrix of a characters 2. Both of these networks come in pairs, doing the same job, e.g. LATIN and LATIN2 networks detect Latin characters but they do it based on completely different inputs. Type 2 network is also activated as a backup network—it improves the results of the type 1 network and also gives results when type 1 network fails to do so. The object of select-regular function 654 is to choose as final identification the results generated by one of the networks.

The result is chosen based on the statuses returned by each network and on various "determine" functions called to make the final decision. The process for selecting final identification result includes the following steps:

a) select-regular function 654 receives two results from type1 and type 2 networks (hereby regarded as Result1 and Result2 accordingly), and the network type that was used to calculate Result 1 (the network type will help to decide which determine functions to call).

b) If both Result1 and Result2 are valid characters, choose_bestfunction 656 is called. Choose-best function 656 is based on the fact that although the networks didn't give final results, they did give some likely candidates as intermediate results. Choose-best function 656 checks these intermediate results from both networks and if some of them are the same it decides to choose them as the final result.

c) If Result1 and Result2 are different then a choice is made. The following table summarizes the logic of the choice.

| Result1 | Result2 | Network | Decision Action |
|---|---|---|---|
| UNKNOWN_CHARACTERS | UNKNOWN_CHARACTERS | ANY | choose_best_characters determine_characters |
| UNKNOWN_CHARACTERS | '2' | DIGIT | determine_2_4 |
| UNKNOWN_CHARACTERS | Not '2' | DIGIT | Result2 |
| '1' or '7' | '3' | DIGIT or DIGIT2 | DIF13. If '1' decide by boundary |
| Any | Not '3' | DIGIT or DIGIT2 | Decide by boundary |
| 'A' | 'M' | LATIN or LATIN2 | determine_A_M |
| 'H' | 'M' | LATIN or LATIN2 | Return 'H' |
| 'M' | 'M' | LATIN or LATIN2 | Return 'M' |
| 'I' | 'M' | LATIN or LATIN2 | Return 'M' |
| Any else | 'M' | LATIN or LATIN2 | Decide by boundary |
| 'U' or 'C' | 'O' | LATIN or LATIN2 | Return 'O' |
| Not 'U' and not 'O' | 'O' | LATIN or LATIN2 | Return Result1 |
| 'M' | 'A' | LATIN or LATIN2 | Determine_A_M |
| 'W' | 'A' | LATIN or LATIN2 | Return 'A' |
| 'R' | 'N' | LATIN or LATIN2 | Determine_R_N |
| 'H' | 'N' | LATIN or LATIN2 | Return 'H' |
| 'W' | 'N' | LATIN or LATIN2 | Return 'W' |
| 'M' | 'N' | LATIN or LATIN2 | Return 'M' |
| 'I' or 'J' | 'N' | LATIN or LATIN2 | Return 'N' |
| Any else | 'N' | LATIN or LATIN2 | Decide by boundary |
| 'N' | 'R' | LATIN or LATIN2 | Determine_R_N |
| 'M' | 'R' | LATIN or LATIN2 | Determine_R_M |
| 'F' | 'R' | LATIN or LATIN2 | Determine_F_R |
| Any else | 'R' | LATIN or LATIN2 | Decide by boundary |
| 'U', 'V' or 'Y' | 'W' | LATIN or LATIN2 | Decide by boundary |
| 'I' | 'W' | LATIN or LATIN2 | Return 'W' |
| 'Q' | 'C' | LATIN or LATIN2 | Return 'Q' |
| 'B' | 'C' | LATIN or LATIN2 | Return 'Q' |
| Any else | 'C' | LATIN or LATIN2 | Decide by boundary |
| 'F' | 'G' | LATIN or LATIN2 | Return 'G' |

| Result1 | Result2 | Network | Decision Action |
|---|---|---|---|
| Not 'F' | 'G' | LATIN or LATIN2 | Decide by boundary |
| Any | UNKNOWN_CHARACTERS | LATIN or LATIN2 | Result1 |
| Any | UNKNOWN_CHARACTERS | DLMIX or DLMIX2 | Result1 |
| Any | Any | DLMIX or DLMIX2 | Decide by boundary |
| Any | Any | Any else | Result1 |

Decision action "Decide by boundary" mentioned in the table above, means that there is a flag telling if the boundary built for type1 neural network surrounds all the characters 2 or if there are some parts not surrounded by it. In some cases the type1 network has high chance of making an error in identification so the backup network's Result2 may be chosen.

Figure 9N:
Figure 9O:
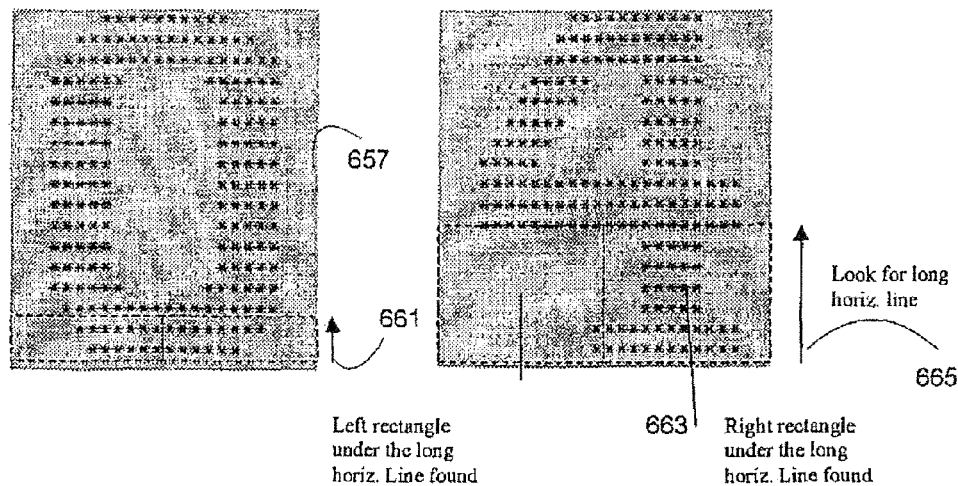
Figure 9P:
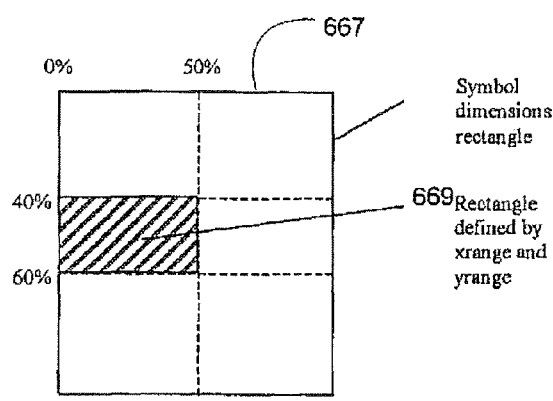
Figure 9Q:
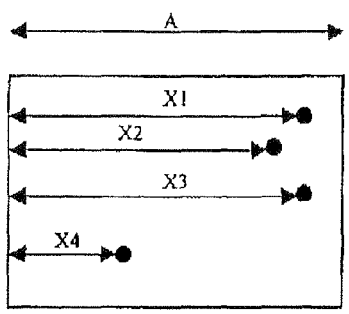

FIG. 9n and 9q illustrates different functions activated during identification process 600.

Determine-0-4 function 658 separates character '0' from character '4' by examining their characters matrix 657 and 659.

In the first step determine_0_4 function 658 algorithm searches for the right edge of the characters 2. It scans columns from right to left calculating the number of black pixels in each column. If the number of black pixels in each column is bigger than 30% of matrix 657 and 659 height, this column is considered to be the right edge of the characters 2. length calculations below regards to the interval between the right edge of the characters 2 and the left edge of the characters 2 that is considered already determined.

In the next step determine_o_4 function 658 algorithm searches for a long horizontal line (at least 85% of the width) starting from the bottom of the matrix as illustrated by arrow 665 in FIG. 9n. When long horizontal line is found two rectangles 661, 663 are built under the line. If the number of black points in the right rectangle 663 are at least 3 times bigger than the number of black points in left rectangle 661, the characters 2 is considered to be '4'. Otherwise it's probably '0'.

Mass-center function 660 calculates the mass center shift on X-axis as will be explained below. The function receives 2 parameters—xrange and yrange. These parameters define a certain rectangle in the characters 2 matrix. They are given as percent ranges—xrange is a range in percents of characters 2 width while yrange is a range in percents of characters 2 height.

An example of defended rectangle 669 found in characters 2 dimensions rectangle 667 is shown in FIG. 9o.

Characters 2 dimensions rectangle 667 xrange is defined to be from 0% to 50% and yrange from 40% to 60%, thus xrange and yrange will define rectangle 669.

Mass center definition depends on black points position in rectangle 669 defined by xrange and yrange. The closer main quantity with black points is to the right border of rectangle 669, the higher is the value of the mass center on X-axis. FIG. 9o illustrated different parameters used during mass center calculation.

According to FIG. 9o mass center is defined according to the formula:

According to FIG. 9q mass center is defined according to the formula: $(X1+X2+X3+X4)/(A*4)$, where 4 defines the number of points and A is the width of rectangle. According to the formula the larger the number of points on the right side of the rectangle is, the higher the mass center value.

Figure 9R:
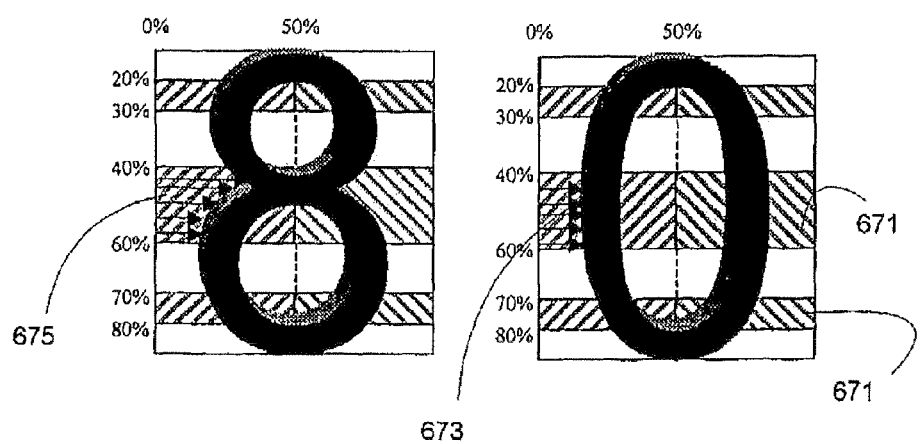

Determine-0-8 function 662 separate characters '0' and '8'. It uses mass-center 660 for calculating mass center in several regions 671 in the 5 characters, and finds the difference between the characters by comparing the mass center value of the different regions 671. FIG. 9r illustrates regions 671 found on characters '8' and '0'. Character '0' has similar mass center 673 in all rectangles while character '8' has some shift in the middle rectangles 675 compared to the upper and lower rectangles. If shift 675 is detected, the function returns '8'. Otherwise it calls determine-0-4 function 658 to make the final decision. Other functions use similar approaches in order to pin-point specific features that can help to separate similar characters.

This description of a preferred embodiment is presented hereinabove in order to enable a person of ordinary skill in the art to design, manufacture and utilize this invention. Various modifications and adaptations to the preferred embodiment will be apparent to those skilled in the art, and different modifications may be applied to different embodiments. Therefore, it will be appreciated that the invention is not limited to what has been described hereinabove merely by way of example. Rather, the invention is limited solely by the claims which follow this description.

What is claimed is:

1. A system for recognizing a cargo container identification characters, said system comprising:
   an image capture device configured to capture a digital image of the cargo container; and
   a computing device operatively connected to the image capture device and configured to execute an identification program that, upon execution, configures the computing device to:
   locate one or more candidate areas within a captured image based on (1) an identification of an angle of rotation and (2) an application of a compensating rotation to at least one of the one or more candidate areas, the compensating rotation corresponding to the angle of rotation,
   enhance the one or more candidate areas using a tilt compensation process which: (1) de-rotates an area of interest in the captured image based on substantially horizontal lines detected in the captured image, and (2) de-rotates one or more characters within the area of interest based on vertical lines determined to be passing through spaces between the one or more characters,
   separate each of the one or more candidate areas into one or more characters based on one or more average character parameters and a defined data format,
   enhance each of the one or more characters, and
   identify each of the one or more characters using one or more neural networks that determine a character group to which a particular character belongs based on a general form of the particular character.

2. The system according to claim 1, wherein the angle of rotation is derived using a coarse tilt angle based on multiple substantially parallel and substantially horizontal lines detected in the captured image.

3. The system according to claim 1, wherein the compensating rotation is applied based on a detection of horizontal lines within a gradient map of the captured image.

4. The system according to claim 1, further comprising multiple separate neural network based recognizers configured in a multilevel architecture.

5. The system according to claim 1, further comprising a binary recognition network configured to distinguish between twin characters.

6. The system according to claim 1, wherein a gross count algorithm is applied on the capture image in order to estimate character width.

7. The system according to claim 6, wherein one or more results of the gross count algorithm are used to associate one or more characters with a predefined character format or font.

8. The system according to claim 1
wherein the identification program further configures the computing device to estimate character height using a multistep algorithm which:
(1) generates a coarse height estimates based on a gray scale level version of the captured image, and (2) a fine estimate based on horizontal gradients.

9. The system according to claim 1, wherein the angle of rotation is determined based on a plurality of substantially straight lines present within the captured image.

10. The system according to claim 1, wherein the one or more candidate areas are located based on one or more horizontal gradients identified within the captured image.

11. The system according to claim 1, wherein the one or more candidate areas are enhanced such that the one or more characters are separated from a background of the captured image.

12. The system according to claim 1, wherein the one or more candidate areas are enhanced such that a border of the one or more candidate areas is defined to account for a character whose upper part has a low horizontal gradient.

13. The system according to claim 1, wherein each of the one or more characters are separated based on a matching of one or more space positions with the defined file format, each of the one or more space positions corresponding to a respective one of the one or more characters.

14. The system according to claim 1, wherein each of the one or more characters are enhanced using a stretching function.

15. The system according to claim 1, wherein each of the one or more characters are identified based on a character code format.

16. A character identification method comprising:
capturing an image of a cargo container with an image capture device;
locating one or more candidate areas within the captured image based on (1) an identification of an angle of rotation and (2) an application of a compensating rotation to at least one of the one or more candidate areas, the compensating rotation corresponding to the angle of rotation;
enhancing the one or more candidate areas using a tilt compensation process which: (1) de-rotates an area of interest in the captured image based on substantially horizontal lines detected in the captured image, and (2) de-rotates one or more characters within the area of interest based on vertical lines determined to be passing through spaces between the one or more characters;
separating each of the one or more candidate areas into one or more characters based on one or more average character parameters and a defined data format;
enhancing each of the one or more characters; and
identifying each of the one or more characters using one or more neural networks that determine a character group to which a particular character belongs based on a general form of the particular character.

17. The method of claim 16, wherein the compensating rotation is applied based on a detection of horizontal lines within a gradient map of the captured image.

18. The method of claim 16, further comprising identifying one or more horizontal gradients within the captured image, and wherein the locating step comprises locating the one or more candidate areas based on the identifying of the one or more horizontal gradients.

19. The method of claim 16, further comprising identifying a character whose upper part has a low horizontal gradient, and wherein the one or more candidate areas are enhanced such that a border of the one or more candidate areas is defined to account for the identified character whose upper part has a low horizontal gradient.

20. The method of claim 16, further comprising matching one or more space positions with the defined file format, each of the one or more space positions corresponding to a respective one of the one or more characters, and wherein each of the one or more characters are separated based on the matching.

* * * * *